United States Patent [19]
Bare

[11] Patent Number: 5,920,699
[45] Date of Patent: Jul. 6, 1999

[54] BROADCAST ISOLATION AND LEVEL 3 NETWORK SWITCH

[75] Inventor: Ballard C. Bare, Auburn, Calif.

[73] Assignee: Hewlett-Packard Company, Palo Alto, Calif.

[21] Appl. No.: 08/744,335

[22] Filed: Nov. 7, 1996

[51] Int. Cl.⁶ .................................................. H04L 12/66
[52] U.S. Cl. ...................................................... 395/200.55
[58] Field of Search .................................... 370/351, 431, 370/400, 402, 401; 395/500, 200.79, 200.55

[56] References Cited

U.S. PATENT DOCUMENTS

| | | | |
|---|---|---|---|
| 5,530,703 | 6/1996 | Liu et al. | 370/85.13 |
| 5,684,800 | 11/1997 | Dobbins et al. | 370/401 |

FOREIGN PATENT DOCUMENTS

| | | | |
|---|---|---|---|
| 0518595 A2 | 12/1992 | European Pat. Off. | G06F 15/16 |
| WO96/34474 | 10/1996 | WIPO | H04L 12/18 |

OTHER PUBLICATIONS

Kohlhepp, "The Riches of Switches", Network Computing, Jan. 15, 1996, pp. 52–66.
Cabletron Unveils SecureFast^R Virtual Networking Contact: Darren Orzechowski Cabletron Systems Inc.
IPX Router Specification, Novell, Inc. Nov. 17, 1992 Version 1.10, Part No. 107–000029–001.

*Primary Examiner*—Ellis B. Ramirez
*Assistant Examiner*—William Titcomb

[57] ABSTRACT

A network switch comprising a switching Application Specific Integrated Circuit (ASIC) and a Virtual Switching Engine (VSE) connected to a plurality of ports. The switching ASIC has a high-speed memory table which enables it to look up addresses that it has previously obtained and to forward unicast packets to said addresses. The VSE is a CPU that makes switching decisions outside of the ASIC and keeps track of any unknown addresses, forwarding the packets out the appropriate ports and answers broadcast packets by proxy for all known addresses without forwarding any of the packets down the VLANs, thereby freeing the VLAN bandwidth from excessive traffic. The system requires no user configuration because the switching methodology is self-adaptive to the network in which it is inserted and has the ability to perform router functions such as level 2 and 3 switching, spanning tree protocols and compatibility with Internetwork Packet and Internetwork Packet Exchange networks.

20 Claims, 13 Drawing Sheets

Note: Each Network is a separate VLAN from the switches perspective.

BROADCAST ISOLATION AND LEVEL 3 NETWORK SWITCH

BACKGROUND OF THE INVENTION

1. Technical Field

The invention relates to Local Area Networks (LAN). More particularly, the invention relates to the monitoring and control of network packet traffic resulting in the reduction of unnecessary traffic across LANs without the use of bridges or routers.

2. Description of the Prior Art

When LAN networks first started growing in the 1980's, a physical limit was quickly reached due to the LAN cable limitations. To solve this problem, LAN bridges were introduced to tie these physical cables together to form larger networks. The bridge would transparently pass packets between LAN segments. In addition, these bridges also could also eavesdrop on the packets and learn which MAC addresses were on each LAN segment. In this way they could keep unicast traffic on the appropriate LAN segment. This increased the overall network throughput so long as the users set up their topology to keep hosts that frequently talked to each other on the same LAN segment.

At some point however, MAC level broadcasts become an intolerably large percent of the network traffic (when accidental bridge loops occurred at set up, broadcast storms could completely disable a network). Broadcasts not only use up network bandwidth but also use up processing power on every host system that the broadcast is passed to (the processor must analyze every broadcast packet up through the network layer to see if the packet is addressed to it). To solve this problem, routers were introduced to segment the network into separate broadcast domains.

At the router boundary, all broadcasts were intercepted and the router would decide which LANs the broadcast would be propagated on (if any). Routers performed this function by looking into level 3 headers and forced the network to be segmented into network level broadcast domains. Although this solved the problem of excessive broadcasts within the network, it introduced an expensive device that would add latency, limit throughput between these broadcast domains and add complexity to the network. To limit the throughput loss across a router, users were forced into topologies where servers and clients needed to remain within the same broadcast domain.

Switches were introduced to allow the creation of Virtual Local Area Networks (VLAN), allowing users to segment their networks without the high costs of routers or low port count of bridges. The problems associated with switches are typified by U.S. Pat. No. 5,521,913 issued to Gridley on May 28, 1996, which teaches an ethernet switch using cut-through switching. This technique merely forwards packets through the VLAN without examining the packet validity until after the packet has been forwarded. This technique and the current methodologies implemented in ethernet switches do not prevent the occurrence of unnecessary and excessive traffic across the VLAN.

Note: This technique can be applied to either cut through or store and forward switches.

Unnecessary and excessive traffic across the VLAN not only slows down the network but, additionally, requires each end node and computer connected to the network to receive and analyze those packets. The result is the overall loss of network bandwidth. The major cause of this loss is broadcast traffic. The present invention achieves what the prior art does not, that is, reduce the traffic across the VLANs and thereby allow the VLAN bandwidth to be used more efficiently.

SUMMARY OF THE INVENTION

The invention provides a solution to the problem of VLAN flooding by implementing broadcast isolation and level 3 switching at the switch level and yet maintaining the high level of media speed required for network applications. The invention thereby provides a solution to the problem solved with bridges and routers, but without the cost/performance impacts and topology constraints they introduced.

The preferred embodiment of the invention comprises a switching Application Specific Integrated Circuit (ASIC) and a Virtual Switching Engine (VSE) connected to a plurality of ports. The switching ASIC has a high-speed memory table which enables it to look up addresses that it has previously obtained and to forward unicast packets to said addresses. When the ASIC discovers a packet that is a broadcast or unknown address packet, the packet is forwarded to the VSE. The VSE is a CPU that makes switching decisions outside of the ASIC. The VSE keeps track of any unknown addresses and forwards the packet out the appropriate ports. While waiting for an answer to the packet, the VSE marks the ASIC's table to indicate that the originator host of the packet exists and to what port it is connected. Once the VSE sees the response to the packet, it again marks the ASIC's table, indicating what port the answering host is on. The VSE answers broadcast packets by proxy for all known addresses without forwarding any of the packets down the VLANs. This frees the VLAN bandwidth from excessive traffic.

The preferred embodiment requires no user configuration because the switching methodology is self-adaptive to the network in which it is inserted. In addition, the functions of the switching ASIC may also be performed in software.

The present invention has the ability to replace router functions such as level 3 switching and broadcast control. It is also compatible with Internetwork Packet (IP) and Internetwork Packet Exchange (IPX) networks.

DETAILED DESCRIPTION OF THE INVENTION

Figure 1:
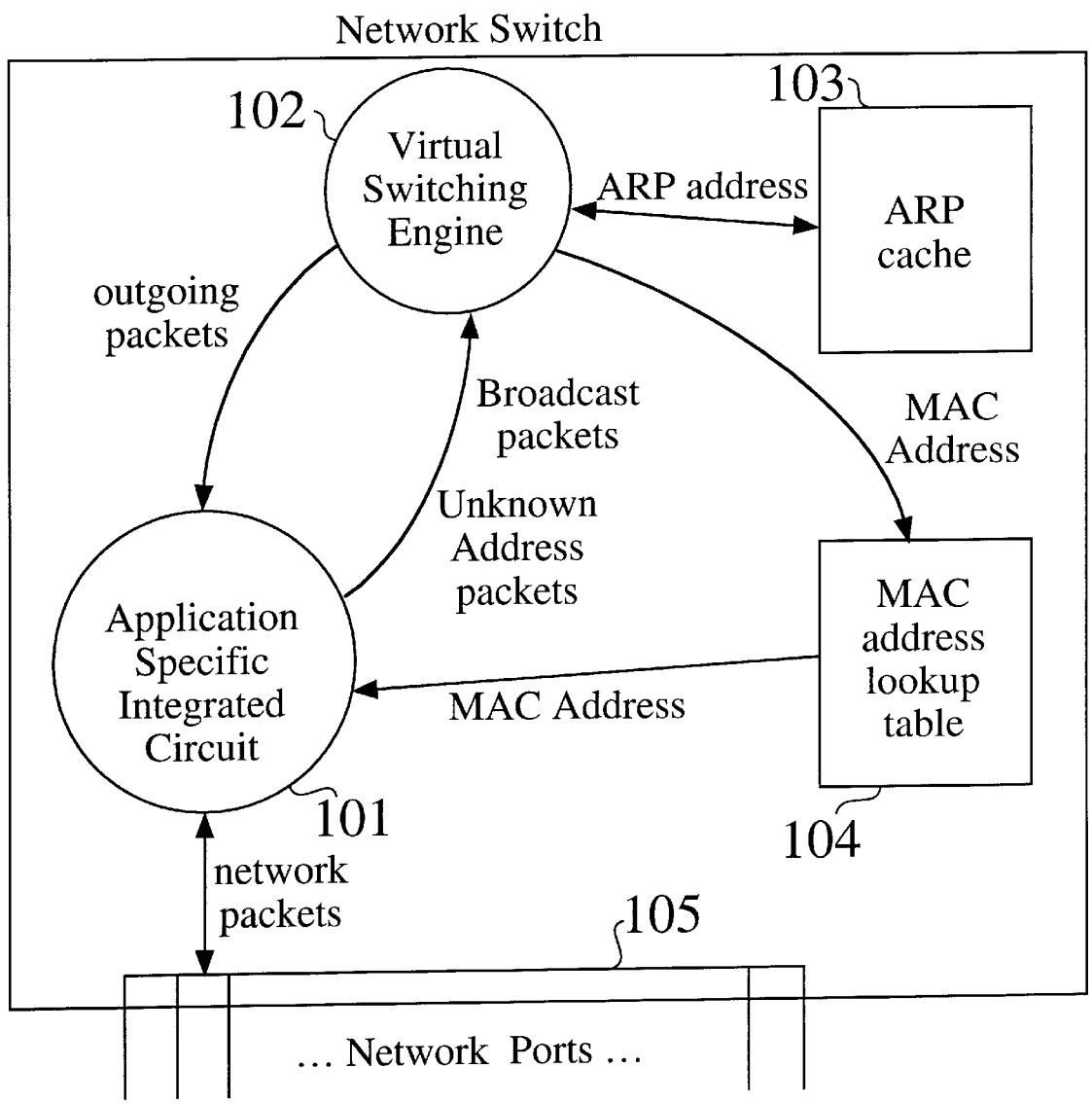
FIG. 1 is a functional representation of a switch according to the invention.
Figure 2:
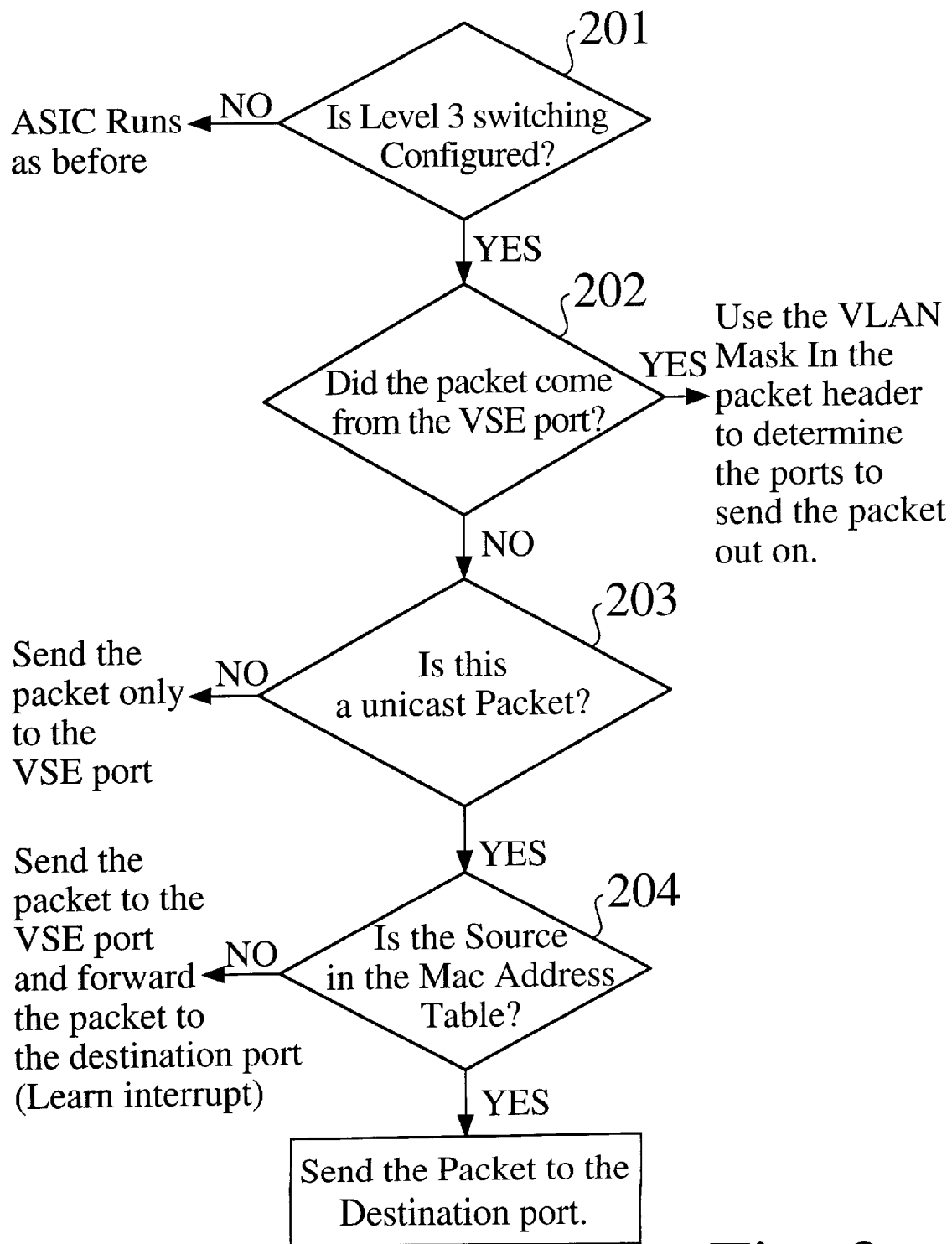
FIG. 2 is a flow diagram of the ASIC packet switching function according to the invention.

Referring to FIGS. 1 and 2, the invention comprises a switching Application Specific Integrated Circuit (ASIC) 101 and a Virtual Switching Engine (VSE) 102 connected to a plurality of ports 105. The switching ASIC 101 performs level 3 201 and unicast (level 2) switching 203. The ASIC 101 has a high-speed memory lookup table 104 which enables it to look up Media Access Control (MAC) addresses that it has previously obtained and to forward unicast packets to said addresses 204. When the ASIC 101 discovers a packet that is a broadcast or unknown address packet 203, the packet is forwarded to the VSE 102. The VSE 102 is a CPU that makes switching decisions outside of the ASIC 101 and looks at the level 3 address of a packet. The VSE 102 keeps track of any unknown addresses in a cache 103 and forwards the packet back to the ASIC 101 for delivery out the appropriate ports 202. While waiting for an answer to the packet, the VSE 102 marks the ASIC's 101 lookup table 104 to indicate that the originator host of the packet exists and to what port it is connected. Once the VSE 102 sees the response to the packet, it again marks the ASIC's 101 lookup table 104, indicating what port the answering host is on. The VSE 102 answers broadcast packets by proxy for all known addresses without forwarding any of the packets down the VLANs.

Protocols such as IP and IPX will use broadcast packets so that end nodes can discover where other nodes are. This enables the nodes to send unicast traffic directed to the appropriate end node. The present invention tracks those broadcasts and once it has learned where the end nodes are, it will proxy respond to any subsequent broadcast packets to prevent that broadcast from going any farther out into the network. The broadcast packets therefore stay on the single segment that is directly connected to the switch. This is a vast improvement over what a normal bridge can do. Although the network concepts described herein refer to Ethernet protocols, one skilled in the art can readily appreciate that these concepts are readily applicable to other types of networks.

The ASIC has a high-speed memory table that contains the specific values of the type of packets that are sent to the VSE. The flexibility of the system allows the ASIC to be configured to identify other types of packets as well as broadcast packets.

Although the switching functions of the invention have been described in the form of an ASIC, one skilled in the art can readily appreciate that the switching ASIC functions may also be implemented in software using a high-speed CPU.

The operation of the present invention is further illustrated through the following descriptions and scenarios.

Broadcast Isolation

IP ARP

Address Resolution Protocol (ARP) packets are broadcast packets in IP protocol and used to directly find the MAC address of a target host. The broadcast ARP contains a MAC address of the source and the level 3 address of the target. When the target receives the ARP packet, it responds with a unicast packet directed at the initiator of the request. Both hosts then know each other's MAC address and can send unicast packets to each other. The following scenario will explain how a switch that intercepts these broadcast packets can reduce the overall network broadcast traffic. This first scenario assumes that the switch and Hosts have just been booted and none of the network elements knows about the other.

Figure 3:
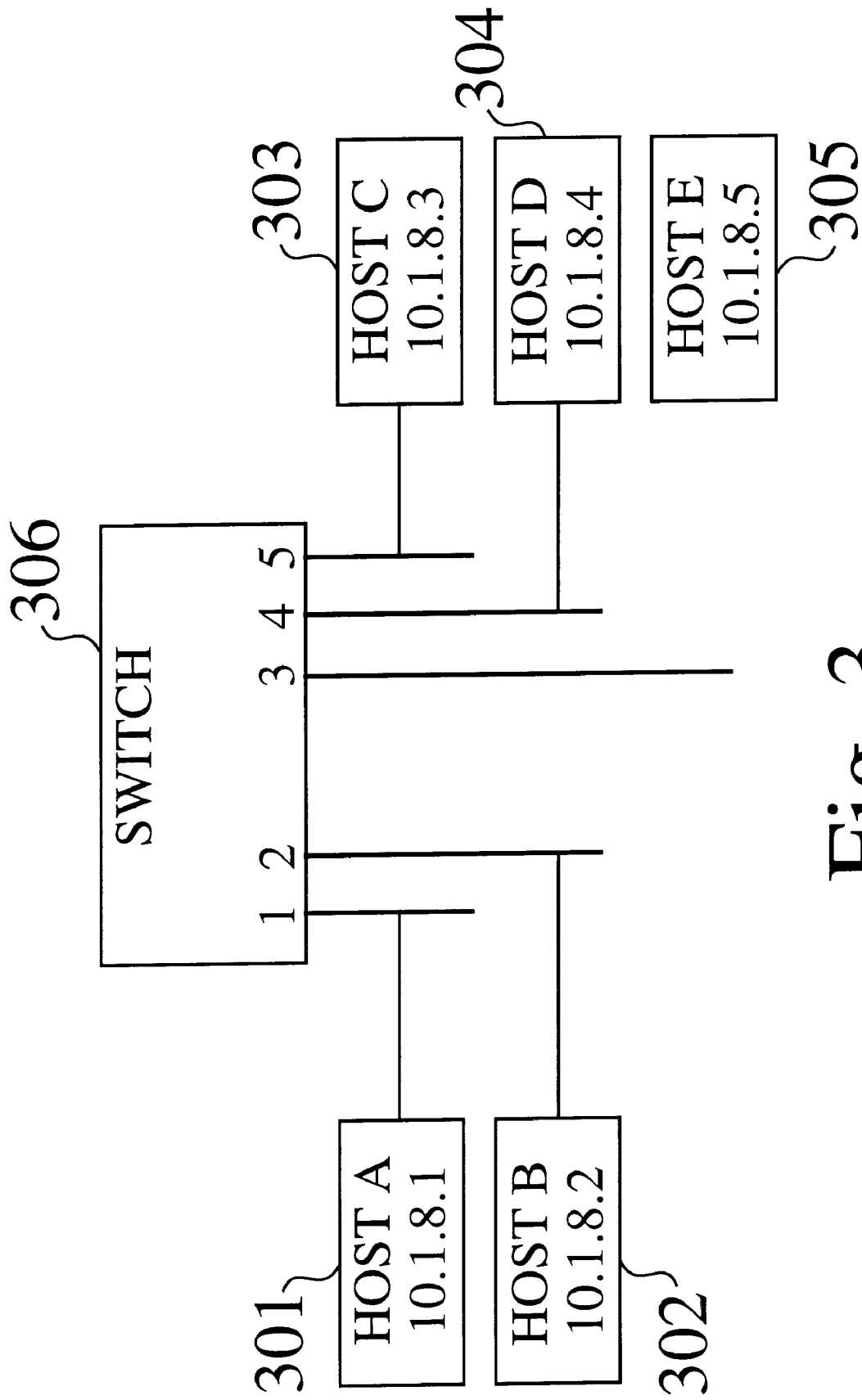
FIG. 3 illustrates a single switch implementing broadcast isolation using IP protocol according to the invention.

Turning to FIG. 3, assume that HOST A 301 wishes to talk with HOST B 302. To learn HOST B's 302 MAC address, HOST A 301 will send out a broadcast ARP. This packet contains the source MAC address of HOST A 301, a broadcast destination MAC address and level 3 addresses for the source and destination. The switch 306 will then learn that HOST A 301 is on Port 1 and can save all the level 2 and 3 information about HOST A 301 in its ARP cache. Since the switch 306 does not know where HOST B 302 is at this time it must flood the ARP packet out all ports. HOST B 302 will receive the packet (as will all other hosts connected to the switch), it will respond to the ARP request with a unicast packet directed to HOST A 301 via the switch 306. When this reply is received by the switch 306 it will forward it directly to HOST A 301. This first packet from HOST B 302 will be monitored by the switch 306 VSE so that it can fill in the ARP cache information about HOST B 302. HOST A 301 can now send unicast packets to HOST B 302 and vice versa. From the switch's 306 point of view, only the switching ASIC is involved, (the switch 306 VSE is freed up for other tasks). At this point no reduction in broadcasts has occurred, this would be true for a router also. HOST C 303 now attempts to talk with HOST B 302. As with HOST A 301, HOST C 303 will send out a broadcast ARP request and, as before, the switch 306 will learn the level 2 and 3 information about HOST C 303. However this time when the switch 306 analyzes the ARP broadcast it will find that it already knows about HOST B 302 and can proxy reply for HOST B 302. Unlike a router proxy reply, the reply from the switch 306 will carry the MAC address of HOST B 302, not the MAC address of the switch 306. From HOST C's 303 point of view it will appear as though HOST B 302 issued the reply. Host C 303 can now send unicast packets directed to HOST B 302 who in turn can reply since the unicast packet carried HOST C's 303 MAC address. The network overhead for the broadcast packet has been removed.

Note that Host A does not receive the ARP request from HOST C, and, depending on HOST A's IP implementation, may not learn HOST C's MAC address from the unicast packet it does receive. In this case, HOST A sends an ARP request out for HOST C. The switch proxies a reply and HOST A is then able to send unicast packets back to HOST C. This detail is not repeated in all subsequent examples but is raised here for completeness.

In this scenario, assume that the switching ASIC sends all broadcast packets up to the switch VSE and nowhere else. The switch VSE is then responsible for forwarding the broadcast. Assume also that a copy of the unicast reply gets sent to the VSE for learning purposes, but the switching ASIC can also forward the unicast reply and remove the need for the switch VSE to perform this function. This method does have a problem when the host system has a dual stack (e.g. IP and IPX). If the host MAC address had already been learned from previous IPX packets then the switching ASIC would not know to pass the ARP reply back up to the switch VSE if it only looks at MAC addresses. The switching ASIC could pass all ARPs up to the switch VSE or the switch VSE could receive the ARP broadcast, but instead of forwarding out the ARP request as is, the switch could send out the broadcast ARP with its IP and MAC address as the source. In this manner the switch is assured of receiving the ARP reply and thereby learns the information in the ARP reply.

In practice, a switch could forward the ARP request as is and mark the cache entry for the target of the ARP request as unresolved. If a reply to the ARP is not seen by the VSE before another ARP request for the same host is received by the switch, then the switch could send out its own ARP request as described. This removes the need for the switch always sending out its own ARP request. Note: By waiting for a subsequent ARP to the same HOST, no timeout is needed for an entry in the unnresolved state. The switch would need to keep track of the pending ARP request from the original source so that it could construct the appropriate response when the reply is received. The proxy responses when addresses are known, work as described above. This also solves the problem of needing to send out an ARP request with a new encapsulation type if the host was already known, but only with a different encapsulation. For the rest of this document the term forwarding the ARP will be used to refer to either generating a new ARP, or to just forward the original ARP request with the understanding that generating a new ARP can solve the problems described above.

This particular mechanism works very well in the server client scenario where clients initiate a conversation to a server. After the first client initiates a conversation with the server, all future client broadcasts can be replied to by the switch and although a given client's ARP cache may time out, the chances are good that sufficient traffic has occurred to prevent the server ARP cache entry in the switch from timing out. If it did, then the traffic was probably very light and the occasional broadcast will not matter.

The switch must keep track of the encapsulations used in its ARP cache. If the encapsulations do not match, the switch should NOT proxy reply if it knows the target host, instead it should ARP for the target host with the new encapsulation. If the target host understands the encapsulation it will reply accordingly. Although the broadcast was not blocked in this case it was limited to only going out the port that the host was on.

The ARP cache built up by the switch should time out (in the same manner as hosts and routers) if packets are not passed to the host within some fixed time. The timeout needs to be tied to the MAC address time out mechanism used with the switching ASIC because the switch VSE does not see any unicast traffic after the initial exchange. Note: A long fixed timeout may be needed for the ARP timeouts of hosts that are on the far side of a router relative to the switch. The MAC address timeout should not be used in this case, since all the hosts would appear to have the same MAC address (the router's MAC address) from the switch's point of view.

IP RIP and other Routing Protocols

When routers are connected to the network they typically use MAC level broadcast packets to distribute their routing information. These packets are required between routers and are sent periodically. Routing information protocol (RIP) packets are transmitted every 30 seconds, but typically hosts do not need to see them. If the switch can determine the ports where routers are connected then it can send this type of packets only out those ports and thus reduce this type of broadcast. The switch can use RIP packets to determine which ports routers are on (because RIP packets are sent out periodically) and only flood those packets on ports they were received on. This same technique can be used to reduce OSPF (Open Shortest Path First, another type of routing protocol) packets (OSPF packets are actually multicast on 0x01005E000005 and 0x01005E000006 and not broadcasts; however, directing them out router ports only can also help reduce excess network traffic).

If these packets are blocked, a switch would need to know when another switch is connected to the port. If a switch does not know, then RIPs could be blocked when they should not be. If each switch waits for the other to send a RIP before it sends a RIP, then a catch 22 occurs and neither switch would send RIP packets to each other and could break connectivity within the network. To overcome this problem either switch to switch ports must be configured or some type of switch to switch protocol needs to occur. A broadcast General Server Query (GSQ) would be sent on all ports of a switch, the reception of this packet could be used to indicate that RIPs should be forwarded (or a simple switch-to-switch protocol can be used, e.g., a unicast packet with a unique MAC address known to all the switches could convey this information periodically).

In some cases there may be a need to flood these packets out ports where routers have not been detected. For example, security requirements may prevent some routers from sending out RIPs but they still may want to receive routing information from other routers. There are also some cases where hosts will eavesdrop on routing protocol packets to learn where gateways exist. Therefore some configuration options will be required to override the blocking of these packets. The default with IP should be to forward these packets and have an option to block them on ports where the system administrator knows they are not needed.

BOOTP and DHCP

Both BOOTP and DHCP use broadcast packets so that clients that do not know their IP address can access servers that do. BOOTP and DHCP have the same format for broadcast requests and replies in those parts of the packet a switch would need to examine. Therefore, what will work for BOOTP will work for DHCP. In some cases the initial BOOTP broadcast will contain the IP address of the target server. The switch could direct the BOOTP broadcast out the correct port if it has previously learned the location of the server. If either the server location is not known or the BOOTP packet does not contain a specific server IP address (i.e. IP destination—255.255.255.255), then the switch will be forced to broadcast the packet out all ports of the VLAN. To reply, the server can either send a unicast packet or a broadcast packet. A server that responds to a BOOTP (or DHCP) request can send a broadcast response. To be able to recognize which client this is for would require the switch to keep track of the transaction ID in the BOOTP request and watch for it in the broadcast reply. This added effort may not be worthwhile to stop this one extra broadcast. If the transaction ID was kept it would need to be cleared when either the broadcast reply came through, the reply could be a unicast however and the switch VSE would not see the packet if the server had previously been found. A timer would be needed to clear the transaction ID. Once the initial packets have been exchanged, further traffic should continue via unicast messages.

IP Router Connections

IP broadcast isolation works within a single IP subnet in the simple case. Hosts within this subnet must go through a router to communicate outside the subnet. However, if multiple IP subnets are put in the same VLAN domain (i.e. the domain is multi-netted), it is possible to avoid using routing to communicate between the subnets. As in the simple case, broadcasts can be limited using the broadcast isolation already described. The hosts in this domain must be aware of multi-netting if they are to take advantage of the performance offered by a switching infrastructure. The term multi-net aware is used here to mean that a host must be able to send an ARP packet out on its network interface and direct it towards the target host even if that host is on another subnet (i.e. it must not look for an external gateway to send the packet to). For a host to do this it must either treat all subnets the same (i.e. it assumes that a router will proxy for the target if necessary), or it must be its own default gateway. To be its own gateway either requires the user to reconfigure the host to perform this function or else it must receive an internet control message protocol (ICMP) redirect from the gateway it tries to use, and the redirect must indicate the host as its own default gateway. Here the switch could be configured to be the default gateway and it could pass the ICMP redirect. If the host is not multi-net aware then it would still need to send off subnet packets to a router. This router in turn would send the packets back into the switching infrastructure using the router's MAC address as the source MAC address in the packet. Doing this removes the benefit of the switching infrastructure since all packets must now pass through the router, connectivity is retained however and this allows non-multi-net aware hosts to co-exist with multi-net aware hosts.

Figure 4:
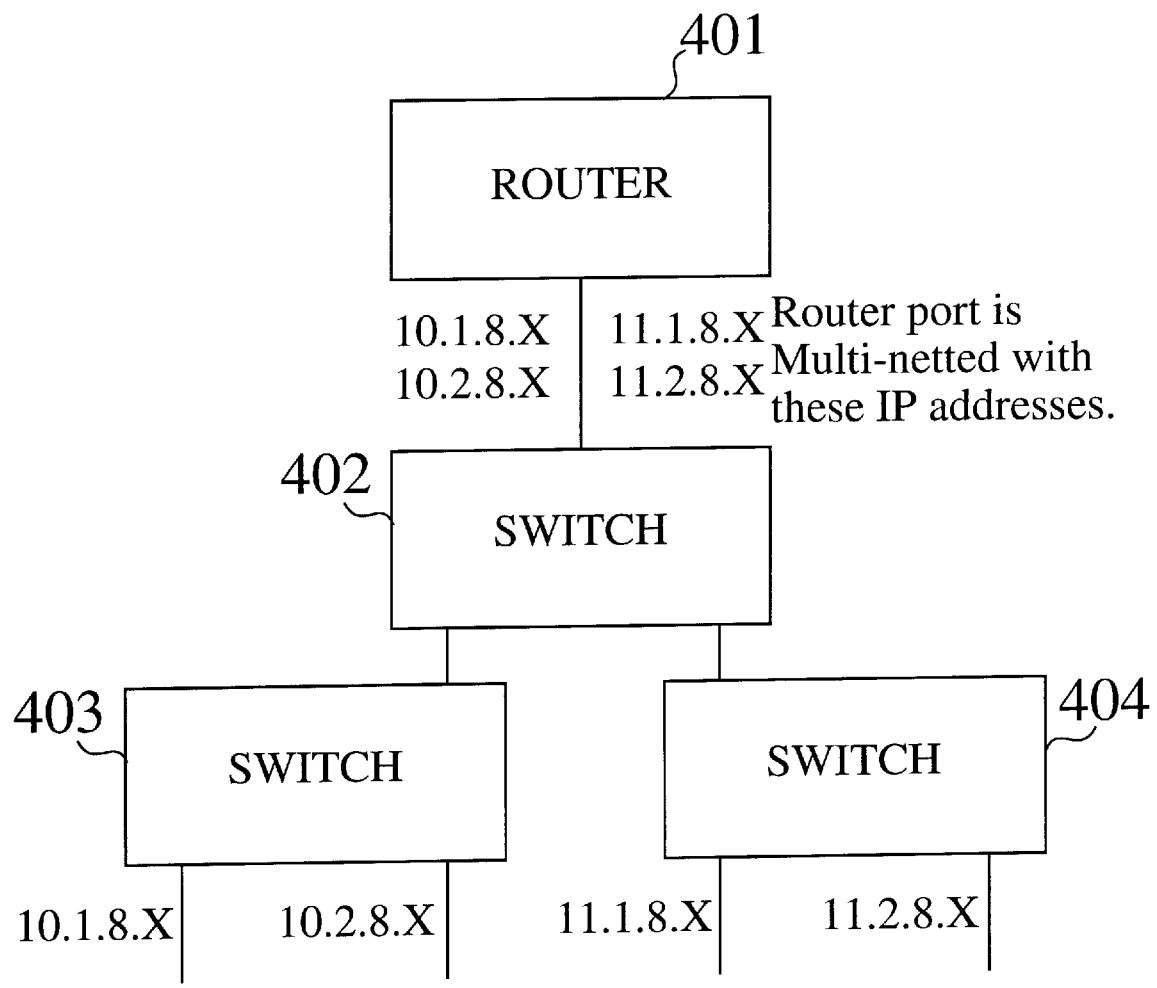
FIG. 4 is a switch infrastructure connected to a router using multi-netting according to the invention.

A router connected to this infrastructure must have its interface multi-netted with all the subnets in the switching domain, this router must also be able to proxy ARP for hosts that are on the other side of the router from the switching network. In the level 3 switching section, an alternative is discussed if the router does not support multi-netting. Using this multi-netting method it should be possible to eliminate routers except where firewalling or WAN connectivity is needed. Broadcast isolation will provide the reduction in broadcasts even in the multi-netted environment. The only slight advantage a router may have is that its routing protocol could indicate which ports to send an initial ARP out on to locate a host for the first time. The switch will broadcast the initial ARP out on all ports. FIG. 4 shows how a switch infrastructure might connected to a router using multi-netting. The router 401 is directly connected to switch 402 and is multi-netted with IP addresses 10.1.8.x, 10.2.8.x, 11.1.8.x and 11.2.8.x. Switch 402 is connected to switches 403 and 404. Switch 403 has IP addresses 10.1.8.x and 10.2.8.x and switch 404 has IP addresses 11.1.8.x and 11.2.8.x.

Tunneling through VLANs

Without doing full level 3 switching, it is possible to do some limited level 3 switching within a single switch configured with multiple VLANs and broadcast isolation. Broadcast isolation is performed as described above within each VLAN. When an IP ARP broadcast is for an IP address in another VLAN, the switch CPU can send the appropriate ARP on the other VLAN. When the ARP response is received, the source VLAN mask for both the initiator and responder includes the port number of responder and initiator, respectively. This allows unicast traffic between the two systems to be switched via the switching ASIC. Although this technique requires some manual configuration of the IP addresses (and subnet masks) of the VLANs, it preserves the VLAN boundaries for unknown and non IP addresses (i.e. the default VLAN mask for the port only includes ports in the VLAN). Software filtering can be done on the broadcast packets to disallow VLAN tunneling of specific subnets configured by the user. This technique requires no switch to switch protocol and only a small amount of additional code added to the broadcast isolation code. As with the multi-netted case above, the hosts that are allowed to do VLAN tunneling will need to be their own default gateway so that they can directly ARP for the host they are looking for. Connected routers will also need to be multi-netted since no Router interface is defined in the switch at this point.

Summary of Broadcast Isolation with IP

The following is a summary of the switch function needed to accomplish IP broadcast isolation. The term VSE is used below and means the CPU that makes switching decisions outside of the Switching ASIC. This VSE may be a CPU on board the switch or an external card plugged into the switch.

The switch VSE must intercept all broadcast packets and analyze ARP packets. (Non-ARP IP broadcasts should be flooded within the VLAN as before. This may or may not be done automatically by the switching ASIC, if a great number of non-ARP broadcasts are expected using the switching ASIC to pass only ARPs to the VSE could greatly off-load the VSE)

The VSE must keep an ARP cache that stores a table relating host MAC address, IP address, supported encapsulation types and port number.

The VSE must be able to direct packets out a given port or ports (e.g. broadcast packets that are flooded or forwarded).

The first time a new source is heard from (i.e. ARP request and reply) the switching ASIC must pass the packet up to the switch VSE, in the case of a unicast destination the switching ASIC can also forward the packet so the VSE won't need to.

When a target host issues a unicast reply with a new encapsulation type, the switching ASIC should pass the packet up to the VSE as in the case of a new source address so that the ARP cache can be updated with the additional encapsulation type. As with the new source scenario the ASIC can also forward the packet. Another way to handle this would be to allow all ARP requests, unicast or broadcasts, to be sent to the VSE, this would solve the problem and not require the ASIC to keep track of encapsulation types. Another solution, using software only, would be to have the VSE test for a new encapsulation type. To do this the VSE would send out an ARP request using its IP and MAC address, in this way the switch VSE is guaranteed to receive the ARP response and can then pass the information to the requesting host.

The VSE must be able to proxy ARP for a host if the encapsulations match, if not it must test for the allowed encapsulation type. The switch must not proxy reply if the target host is on the same port as the initiator of the ARP.

When RIP packets and other types of multicast and routing protocol packets are received, they should only be flooded out ports that these type of packets have been received on (of course a given packet should never go out a port it was received on). Override configuration options for this feature need to be provided for some special cases.

For BOOTP and DHCP broadcast requests, the switch can examine the packet for a destination IP address and, if found, send it out the correct port. Optionally the switch could keep track of the transaction ID in the BOOTP request and use this to direct a broadcast BOOTP reply.

If multi-netted switch domains are supported, the switch must be able to send ICMP redirects to the host that sent a packet for a host on another subnet but directed to the switch MAC address (i.e. the host used the switch as a default gateway and the switch redirects the host to be its own default gateway, which could possibly reduce the amount of host reconfiguration necessary in a multi-netted environment).

The ARP cache timeout should be tied to the MAC address timeout of the switching ASIC with the exception mentioned previously of a Host on the far side of a router relative to the switch.

On a unicast packet were the source is known but the destination is not known the switching ASIC should flood the packet out the VLAN and not inform the VSE. This is should be a temporary condition that only exists when a switch has been rebooted and the end host systems still know about each other from before the switch was rebooted.

Within a switch VLAN to VLAN tunneling can be done for additional flexibility.

Broadcast Isolation with IPX

Client Server interactions with Broadcast Isolation

In the broadcast isolation, the switch will send out a GSQ on each port and cache the responses. The switch will cache all the service advertising protocol (SAP) information (comparable to a router). However, unlike a router, the switch will not consolidate SAPs. The switch will rebroadcast the individual SAP packets. The source mac address will be left unchanged (i.e. the source MAC address will be the original server's MAC address). This allows all the switches to learn server MAC addresses needed for broadcast isolation. When a switch responds to a GSQ, it will need to send out a series of SAPs. From the sender's point of view it will look as if several individual servers responded.

When a client issues a Nearest Server Query (NSQ), the switch will cache the client MAC address in the switch table and respond assuming no local servers exist on the switch port. Unlike the router however, at this point the switch will not reply with the switch MAC address, the switch will put in the actual MAC address of the server (It could just as well respond with the VLAN MAC address since the clients seem to ignore this information anyway). The client then sends the broadcast RIP request and the switch will respond using the MAC address of the server (the server's MAC address was learned from the SAP response). Now all unicast packets to and from the client and server will take place via normal switching. Neither the internal network number of the server nor the IPX address of the client will be used by the switch to determine how to get the unicast packets to the client or server. If multiple equivalent servers exist, the switch should probably use a round robin scheme, or count of client server connections or current traffic load to a given server to decide which server to tell the clients about, in this way one server won't get all the client connections. The user could also configure different VLANs within the switch to isolate specific clients with specific servers.

The switch responding to the broadcast NSQ and RIP is one of the ways that broadcast isolation reduces the amount of broadcast traffic as compared to a pure bridged environment.

The switch will send periodic SAPs (in the same manner as a router) whenever they are received and no actual SAP and/or RIP timer in the switch is required. These packets are only used by other broadcast isolation switches, routers and servers. Therefore, further broadcast reduction occurs if the switch only sends SAPs out ports from which it received SAPs or a GSQ. Broadcast RIP response packets only need to be sent out ports that have routers connected (i.e. ports where broadcast RIP responses have been received). An override may be needed to allow RIPs and SAPs to be propagated out ports that did not send them out, should a listen-only router/server exist on those ports (e.g. old jet direct cards would need this information passed).

Other possible ways to reduce IPX broadcast traffic includes server configuration to use triggered SAPs rather than sending them out ever 60 seconds, using filtering in the switch to limit some servers/server types to specific portions of the network (this is also a security enhancement) or the reduction of the number of encapsulations required in the network (a duplicate SAP would be sent out for each supported encapsulation).

For devices such as print servers, the device acts as a client to the file server. It connects to the file server at boot up just as a client would. When a regular client wants to access the print server, it sends its request to the file server that it connected to. In some cases the file server is also the print server.

A timeout is needed for the client/server addresses if no packets are received from them for an extended time period. The timeout should be tied to the MAC address timeout using the timeout mechanisms supported by the switching ASIC because the unicast packets are not seen by the switch VSE.

Multi-netting in IPX

Multi-netting is allowed in IPX, but each multi-netted network must use a different encapsulation type. This limits the number of multi-netted networks to four. The allowed encapsulation types are sub-network access protocol (SNAP), Ethernet, 802.2 and Novell (also called 802.3 Raw). The switch cannot do encapsulation translation on any unicast packets. Therefore, if multiple IPX networks are configured in the same switch domain (multi-netted), the switch must only respond to an NSQ if the server it is proxy responding for supports the correct encapsulation type.

In a router situation, a client could be using 802.2 encapsulation and the server could be using SNAP encapsulation. The router would translate all unicast packets between the two systems and allow them to talk. However, in the switch situation, this cannot be done because unicast packets are sent via level 2 switching. The best choice is to send a GSQ for each encapsulation type out all ports when the switch first comes up. The VSE would then cache the internal network number, MAC address and encapsulation types in the responses from each server, and respond to client NSQ's and RIPs only with servers that have the same encapsulation type as the client. Most modern servers understand all the encapsulation types and this should not be much of a limitation. This will require the users to either configure all their clients/preferred server combinations with the same encapsulation or to allow their servers to support all the needed encapsulation types.

If all four encapsulations are supported on a given server, then the port that server is on will need to be multi-netted with four IPX addresses. The periodic SAPs are also encapsulated, and a given SAP packet can only include SAPs with the same encapsulation as that SAP. For example, if server A had all four encapsulations and server B only responded to the GSQ with the 802.2 encapsulation, then all four encapsulations can be used for SAP packets including server A, but only SAP packets with 802.2 encapsulation can include server B. In general, multi-netting IPX networks is not a good idea because it will increase the amount of broadcast traffic passed throughout the network (the same would be true for a router).

IPX Router Connections

As with IP, IPX broadcast isolation works within a single VLAN. This makes broadcast isolation completely transparent to router connections. Although it is possible to have multiple IPX networks within the VLAN it is very limited since a maximum of four IPX addresses could be configured since each one would need a different encapsulation. Since no encapsulation translation can be done, server client communication will be limited to those that support like encapsulations. In general if multiple IPX networks are needed the communication between them will require a router. On the brighter side, IPX clients don't know or care about the IPX network number. The IPX network number is only used to determine the best path to pass packets from a server to a client through a routed environment. The network number is determined by routers/servers. From a broadcast reduction point of view there is no real advantage to putting servers in different IPX networks. Therefore if the user is willing to configure all the servers to use the same IPX network the switch could limit broadcast throughout the entire domain. Router broadcast limitation requires the network boundaries, the switch does not.

However, there still may be reasons to use a router. For example, if security is required, the router will look at all broadcast and unicast traffic and can filter those packets based on the policies configured in the router. When Wan connectivity is required, a router will be needed because the remote site should be on another IPX network. By using different network numbers, groups of clients can be associated with specific servers (to some extent the switch with broadcast isolation can do the same thing using multi-netting and different encapsulations to group clients and servers). Another way for clients to group with specific servers is for clients to request a specific server, if the client is configured to do so.

IPX Packet Type 20

For some protocols (such as NetBIOS) a method is needed to propagate broadcasts throughout the entire IPX network. IPX packet type 20 is used for this purpose and should be flooded throughout the VLAN. It may be desirable to add a configuration option that allows the user to block their propagation on some ports.

Summary of Broadcast Isolation with IPX

The following is a summary of the switch functions needed to accomplish IPX broadcast Isolation.

The switch VSE must intercept all broadcast packets. The packets to analyze will include GSQs, NSQs, RIPs and SAPs.

The VSE must issue a GSQ at boot up to learn about the available servers. The information in SAP packets passed back must be cached. This information includes the server internal network number, encapsulation type and server MAC address.

The switch must respond to NSQ packets from clients with the internal network number and MAC address of the nearest server whose encapsulation types match unless a server with the appropriate encapsulation type exists on the port that the request came in on (servers with equal cost should probably be chosen in fashion such that the same server is to not always used).

The switch must be able to respond to a broadcast RIP request with the MAC address of the server returned in the response to a previous NSQ.

The VSE must be able to direct packets out a given port or ports in the same manner as with IP (e.g. broadcast packets that are flooded or forwarded).

The first time a new source is heard from (e.g. NSQ request) the switching ASIC must pass the packet up to the switch VSE. In the case of a unicast destination, the switching ASIC can also forward the packet and bypass the VSE.

RIP and SAP packets should only be flooded out ports that these type of packets have been received on (of course a given packet should never go out a port it was received on). Override configuration options for this feature need to be provided for some special cases. A port that has received a GSQ should also send out SAP packets.

SAP packets must be sent out when received. However, unlike a router, these packets cannot be consolidated into a single packet containing up to seven SAPs. This is necessary because the MAC addresses for the individual servers must be maintained. Possible configuration options may be added to send out SAPs infrequently or on a triggered update basis. The switch will need to send out a sequence of SAPs when a GSQ is received because it cannot consolidate them, the only exception occurs with SAPs from the same MAC address which could be consolidated.

The client and server address timeouts should be tied to the MAC address timeout mechanism.

Diagnostic packets should be responded to and flooded.

IPX Type 20 packets should be flooded.

If multi-netted switch domains are supported, the switch must be able to send a GSQ with all encapsulation types to learn which encapsulations the different servers support. Only clients with the same encapsulation type as the servers can connect. For a unicast packet where the source is known but the destination is not known, the switching ASIC should flood the packet out the VLAN and not inform the VSE. This is should be a temporary condition that only exists when a switch has been rebooted and the end host systems knew about each other before the switch was rebooted.

Passive verses Active Broadcast Isolation

The switch must first know the MAC address of the target host to perform the proxy functions and limit the broadcast packets. A switch learns the MAC addresses of all hosts connected to a given port by eavesdropping on the packets received on that port. This requires no protocol and a given switch will only learn about MAC addresses that it has seen go by. This passive method of learning is very easy to implement and is completely transparent to the user. However, if several switches exist in the network, it is quite possible for one switch to learn about MAC addresses that another switch has not. In these cases it is possible for broadcasts to be forwarded that would not necessarily be needed if the switches had passed around their information. However, as time progresses and more MAC addresses are passively learned by the switches, these excess broadcasts would become less and less frequent (because ARP caches would time out, the active passing of ARP information would always have fewer ARP broadcasts then the passive method). What is currently not clear is if the number of broadcasts using the passive method would be less than the active passing of ARP caches, because passing the ARP caches would itself entail some type of broadcast or multicast packets. This protocol may not be worthwhile for just broadcast isolation. It may however be worthwhile if it is also used to pass VLAN information between the switches. This information could be used for implicit VLAN determination, allowing single switch to switch connections to pass packets from different VLANs. This type of information may also be very useful for auto VLAN configuration.

Level 3 Switch Concept Overview

In the past, level 3 switching has been the domain of routers. All packets are processed up though level 3 protocols in routers to determine which port(s) to send the packet(s) out on. The main reason for this has been to limit level 2 broadcast packets to a given segment of the network (e.g. a given subnet in IP terms). The price of broadcast isolation by routers has been increased packet delay for all packets along with greater hardware cost for a processor that can deal with the load. Although broadcast isolation can reduce the broadcasts, it does not allow the networking hierarchy without the continued use of routers to get between VLANs. The goal of the level 3 switching described herein will be to retain the speed of level 2 switching for unicast traffic throughout a network, eliminate the excess broadcast traffic and allow inter-network connections without the need for a router. Level 3 switching will use concepts described in broadcast isolation and add routing of broadcast packets to allow packets to cross VLAN boundaries.

Today's switches only do level 2 switching and break up broadcast domains with VLANs. In order to pass traffic between VLANs the switch must have a separate connection for each VLAN to a router. To eliminate the external router, a router could be placed in the switch, but it would still have the delays and throughput problems introduced by routing. The internal router could instead do level 3 routing only on broadcast/flooded traffic and do the high speed level 2 switching on all unicast traffic. In effect, unicast traffic for learned MAC addresses is now treated as a single VLAN, only broadcast/flooded traffic would be split into separate VLANs. In this method, the speed benefits of the level 2 switch are retained as well as off-loading the routing engine. The routing engine handles the broadcast/flooded traffic and the broadcast isolation afforded by standard routing is retained. The term broadcast/flooded traffic is used when referring to the type of packets handled by the routing engine rather than just broadcasts. This is because the routing engine will be required to handle any broadcast packets.

Another enhancement will also include sending all unicast traffic to the VSE the first time a given source is heard from (all learn/move interrupts). This enhancement would reduce the number of unnecessary broadcasts. It is also needed in the auto-configuration of VLANs described below. The scenarios in the sections that follow clarify these concepts.

Some type of level 3 information will need to be passed between the switches when multiple switches are connected together. This is used to give the internal routing engine the necessary information for the level 3 switching of broadcasts. This could be a modified version of RIP or even a proprietary protocol that passes around MAC addresses along with level 3 information. No packet tagging is required when a VLAN spans multiple switches because these methods route packets between VLANs based on level 3 information. The use of a routing protocol and the routing of broadcast traffic is the main addition to broadcast isolation to achieve level 3 switching. All the concepts used in broadcast isolation remain intact.

This method of level 3 switching allows for:
Unicast packet switching with the speed of the level 2 switch, off-loading the level 3 processor.
Complete broadcast control and broadcast filtering capabilities.
Reduced flooding of traffic as compared to current switches.
VLANs can span switch boundaries without packet encapsulation.
VLANs based on level 3 protocols rather than just being port based allowing multiple VLANs on the same port.
Compatibility with today's IP and IPX networks.
Connectivity to existing routers and networks.
Redundant links.
Added security or unicast filtering (firewalls).
Auto learning of VLANs.
Interoperability with VLAN tagging.
IP Hosts find out about each other with broadcast ARP packets in IP (as discussed in the broadcast isolation section). When a router is used, a modern host will ARP for the router when off subnet host communication is required, less sophisticated hosts will ARP directly for the end station and the router will reply for the target host using the router's MAC address, if configured (proxy ARP). In either case, the unicast packets that follow are sent to the router's MAC address. Routers are either statically configured or they need to run a routing protocol to learn about the networks they need to forward to. In a switch scenario, the ARP packets will need to be addressed to the target host, not to a gateway. To achieve this with subnet aware hosts, they must be configured to be their own default gateway. If the switch has not learned the MAC address of the target, then it will forward the ARP request to the appropriate subnet. If the switch has learned the target MAC address then it will reply for the target host with the target host's MAC address. If the switch knows that the target is on the same port that it received the ARP request on, it will not respond. It will instead drop the packet and let the host respond. In either case, the unicast packets that follow will be sent to the destination MAC address of the host, not the switch. This in turn will allow all the unicast traffic to be sent via level 2 switching, although the switches do not route unicast packets, they do route the broadcast packets and for this reason they need to learn the network topology as a router would. To do this they can be either manually configured with all of the subnets (the IP subnet will be the VLAN broadcast domain) or they can run some type of routing protocol such as a modified RIP.

The following scenarios will help to understand how this method works for IP.

Figure 5:
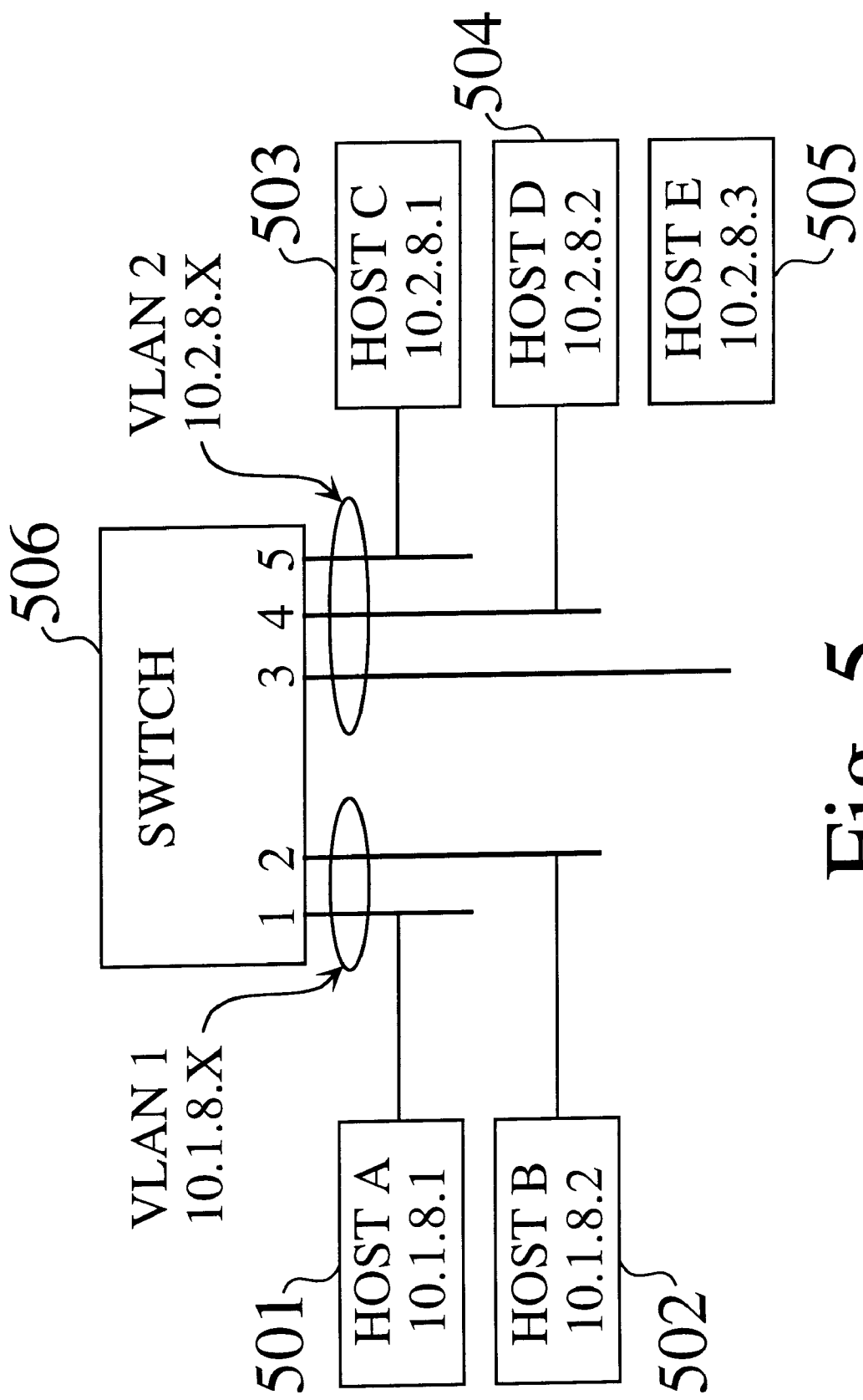
FIG. 5 illustrates a single switch having multiple VLANs using IP protocol according to the invention.

Turning to FIG. 5, the next two scenarios will use a single switch. In these scenarios the switch 506 has been configured with 2 VLANs with ports 1 and 2 in VLAN 1 and port 3, 4 and 5 in VLAN 2. The VLANs are defined based on the IP subnet that they connect to, VLAN 1 is associated with IP subnet 10.1.8.x and VLAN 2 is associated with IP subnet 10.2.8.x.

IP Scenario 1 (Single switch at initialization).

In this scenario, the hosts and switch have just been booted and no ARP caches or MAC address tables exist in any of the network components. Host A 501 wishes to talk to HOST C 503. Host A 501 will send an ARP to find the MAC address of HOST C 503 (10.2.8.1). The source MAC address in the ARP request will be Host A's 501 MAC address and the destination MAC address will be a broadcast address. The switch 406 receives this packet and learns that HOST A 501 is on port 1 and sends the packet to the VSE because the destination is a broadcast. The VSE analyzes the packet and because the destination is the 10.2.8.x network the VSE forwards the ARP request packet out on ports 3, 4 and 5. The VSE also adds HOST A 501 to its ARP cache and marks the ASIC's MAC address table to indicate that future unicast traffic from HOST A 501 is not to be sent to the VSE if the destination MAC address is known. HOST C 503 will receive the ARP broadcast and send a unicast ARP reply. When the switch 406 receives the reply it adds HOST C 503 to the MAC address table and although the destination MAC address is known, this is the first time that the source MAC address of HOST C 503 has been heard from and the unicast packet is sent to the VSE. The VSE analyzes the packet and adds Host C 503 to its ARP cache and marks the ASIC's MAC address table to indicate that future unicast traffic from HOST C 503 is not to be sent to the VSE if the destination MAC address is known. The switch 406 then forwards the ARP reply to port 1 so HOST A 501 can add HOST C 503 to its ARP cache. At this point, all future unicast traffic sent between HOST A 501 and C 503 is switched at level 2 and bypasses the VSE. Whether packets are sent on the same VLAN or to a different VLAN, the broadcasts always go to the VSE. The VSE then decides which ports to send the packet out on. The only difference is when a packet is destined for the same VLAN, the broadcast would not be sent to all ports in the VLAN—the originating port would be left out.

IP Scenario 2 (Single switch after some learning has occurred).

This scenario starts with the assumption that scenario 1 above has just run (i.e. the switch 506 has HOST A 501 and C 503 in MAC address and ARP caches). Host B 502 now wishes to talk to HOST C 503. Host B 502 sends an ARP to HOST C 503. The source MAC address in the ARP request will be Host B's 502 MAC address and the destination MAC address will be a broadcast address. The switch 506 receives this packet and learns that HOST B 502 is on port 2 and sends the packet to the VSE because the destination is a broadcast. The VSE analyzes the packet and because the destination is 10.2.8.1 is in its ARP cache it can send the reply for HOST C 503. This proxy reply would actually use the MAC address of HOST C 503, it would NOT use the switch port MAC address. The initial broadcast would go no further than the VSE. If HOST B 502 sent a MAC broadcast directed to HOST C 503 other than an ARP (e.g. a BOOTP) the VSE would forward the packet but only on port 5. This demonstrates how broadcasts have now been reduced on a given VLAN by sending them out only on the necessary port. The VSE also adds HOST B 502 to its ARP cache and marks the ASIC's MAC address table to indicate that future unicast traffic from HOST B 502 is not to be sent to the VSE if the destination MAC address is known. At this point, all future unicast traffic sent between HOST B 502 and C 503 is switched at level 2 and bypasses the VSE.

Figure 6:
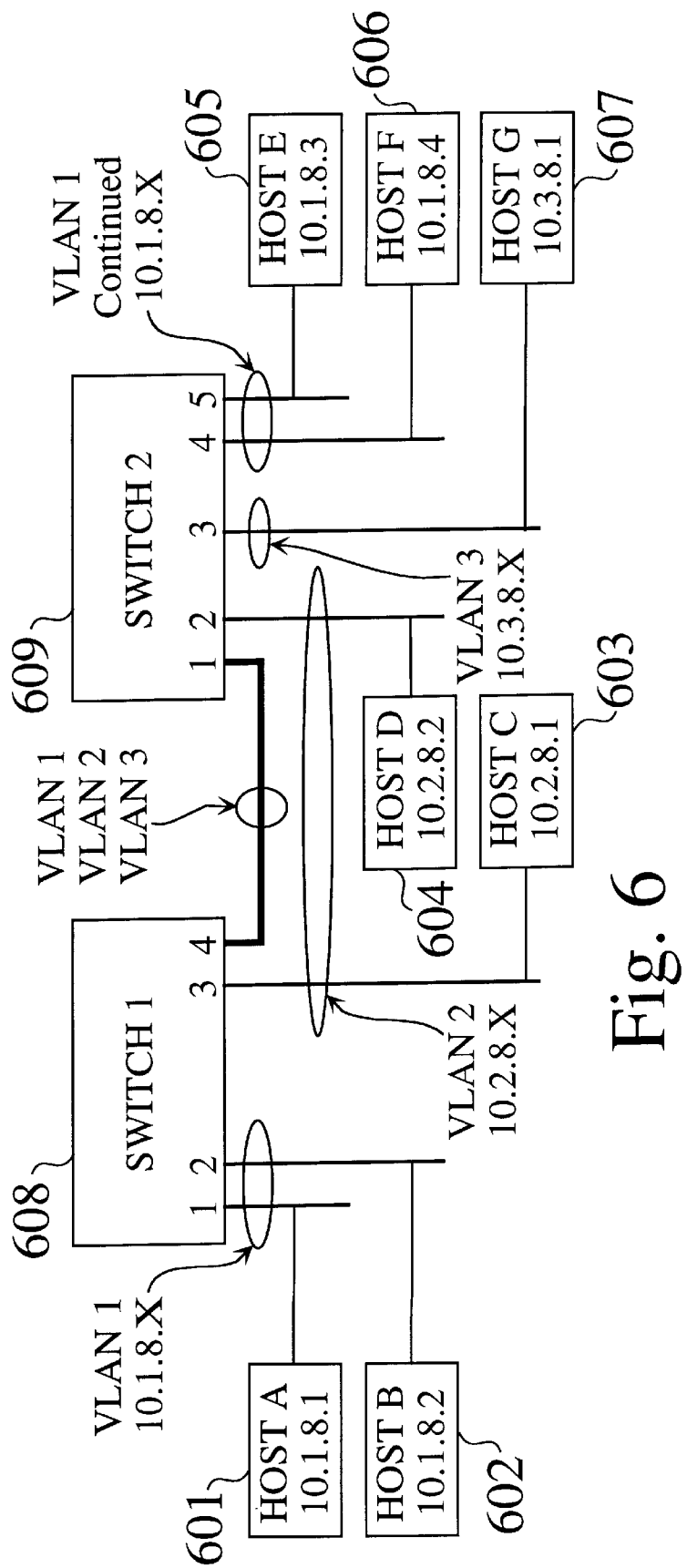
FIG. 6 illustrates a multi-switch environment with a segmented VLAN according to the invention.

Using FIG. 6, the following scenarios will examine the multi-switch case with the VLAN spanning switch boundaries.

In these multi-switch scenarios, three VLANs have been configured. VLAN 1 is the 10.1.8.x IP subnet and is on ports 1 and 2 of switch #1 608 and ports 4 and 5 of switch #2 609. VLAN 2 is on the 10.2.8.X IP subnet and is on port 3 of switch #1 608 and port 2 of switch #2 609. VLAN 3 is on the 10.3.8.X IP subnet and connects only to port 3 of switch # 2. Port 4 of switch #1 608 and port 1 of switch #2 609 connect the switches together and can be considered as a member of all the VLANs. The user would only need to configure these two ports as the switch to switch port and not necessarily configure them to be in all the VLANs.

For switch #1 608 to know that VLAN 1 and 2 also exists on switch # 2 609 and vice versa, some type of switch to switch protocol needs to run. Although it would be possible to manually configure switch #1 608 to know that VLAN 1, 2 and 3 continue out port 4, this would seem to be cumbersome and a protocol to confer this information would be much more user friendly. For the first pass of this concept assume a modified version of IP RIP is used to convey the information. When the switches boot up, they will start passing RIP packets back and forth. Since the MAC destination address of RIP packets is a broadcast, the packets will be passed to the VSE. The VSE on switch #1 608 analyzes the RIP packets and learns that the 10.1.8.X, 10.2.8.x and 10.3.8.X subnets also exist out port 4. Although the format of the packets is standard IP RIP, their interpretation by the switch is slightly different than that of a router. A router would interpret the information to be an ALTERNATE route to the 10.1.8.x network, while the switch will interpret the data to mean an EXTENSION of the same subnet.

IP Scenario 3 (Getting to the same VLAN on a different switch).

In this scenario, Host A 601 (10.1.8.1) wishes to talk to Host E 605 (10.1.8.3) and it sends out an ARP to learn Host E's 605 MAC address. Although both systems are in the same VLAN, they are on different switches. However, because the RIP line protocol has informed the VSE on switch #1 608 that port 4 is also on the 10.1.8.x subnet, the broadcast ARP sent out by Host A 601 is forwarded to ports 2 and 4 (port 1 was left off because it was the originating port number). The VSE on switch #1 608 also puts Host A 601 in its ARP cache. When switch #2 609 receives the broadcast it sends it to its VSE which adds Host A 601 to its ARP cache and then forwards it to ports 4 and 5. Host E now replies to the packet and, as in the previous scenarios, this first unicast packet (the ARP reply) will be sent to the VSE on switch #2 609 so it can add Host E 605 to its ARP cache as it forwards the packet out port 1. When switch #1 608 receives the ARP reply it passes the packet to its VSE for ARP caching. The VSE on switch #1 608 forwards the packet out port 1. From this point on, all unicast packets between these two hosts will be sent via level 2 switching.

IP Scenario 4 (Getting to a different VLAN on a different switch).

In this scenario, Host B 602 (10.1.8.2) wishes to talk to Host G 607 (10.3.8.1) and it sends out an ARP to learn Host G's 607 MAC address. Switch #1 608 knows from the RIP protocol that the 10.3.8.x subnet can only be reached via port 4. Therefore, the broadcast ARP sent out by Host B 602 will be forwarded to port 4 only. The VSE on switch #1 608 puts Host B 602 in its ARP cache. When switch #2 609 receives the broadcast it sends it to its VSE which adds Host B 602 to its ARP cache and then forwards it to port 3. Host G 607 replies to the packet and, as in the previous scenarios, this first unicast packet (the ARP reply) will be sent to the VSE on switch #2 609 so it can add Host G 607 to its ARP cache as it forwards the packet out port 1. When switch #1 608 receives the ARP reply it will also pass the packet to its VSE for ARP caching. The VSE on switch #1 608 forwards the packet out port 2. From this point on, all unicast packets between these two hosts will be sent via level 2 switching.

IPX

When a router comes up in the IPX world, it sends out a GSQ on each port. All the servers on the various ports will respond by passing back their internal network number to the requesting router. The router then caches this information to use when a client requests a server connection. Periodic SAPs from the servers will keep the information current. A router will also consolidate the SAPs it has learned and rebroadcast them using its MAC address as the source (it can consolidate up to seven SAPs in one packet). This allows other directly connected routers to know the MAC address of the next hop for a given server. Routers also pass IPX RIP packets to learn the best route to IPX network numbers. This forwarding is only used on unicast packets sent from the server to the client. The client to server packets use the server's internal network number.

When a client wishes to connect to a file server it will send out an NSQ request with network number 0. If a local server is present, the router will allow that server to respond. If a local server is not present, the router will respond using its MAC address, the local network number and the internal network number of the server. The client then sends out a RIP request (a broadcast) to find the best route to the server it asked for in the NSQ (i.e. the NSQ is only used by the client to get the internal network number of the file server). The router then responds to the RIP (a unicast response) with its MAC address as the destination (this RIP response only contains information on the one server). After receiving the RIP response, the client will then direct its unicast server requests to the router. The router will forward these packets to the server who in turn will pass a unicast response back to the router which will forward them to the client.

The same basic operations will occur in a switch scenario. The switch will send out a GSQ on each port and cache the responses. The switch will cache all the SAP information (comparable to a router). However, unlike a router, the switch will not consolidate SAPs. The switch will rebroadcast the SAP packets and change only the intermediate network's value (hop count) and the network number (the rate of these rebroadcasts can be either configured in the switch or determined by the rate at which they are received by the servers). The intermediate network's number will typically be incriminated and the network number will be changed to the network number of the port the packet is sent out on. The source mac address will be left unchanged (i.e. the server's MAC address). This allows all the switches to learn server MAC addresses needed for the level 2 switching. When a switch responds to a GSQ it will need to send out a series of SAPs, not a consolidated list. From the sender of the GSQ's point of view it will look as though several individual servers responded.

When a client issues an NSQ, the switch will cache the client address and, assuming no local servers, the switch will respond. Instead of replying with the switch MAC address, the switch will put in the actual MAC address of the server (It could just as well respond with the VLAN MAC address because the clients seem to ignore this information). The client then sends the broadcast RIP request and the switch will respond using the MAC address of the server (the MAC address was learned from the SAP response). All unicast packets to and from the client and server will take place via level 2 switching. The switch's response to the broadcast NSQ and RIP is where the level 3 switch reduces the amount of broadcast traffic as compared to a pure bridged environment. This traffic reduction does not depend on VLANs and would still occur in a single VLAN/IPX network environment. The switch will send periodic RIPs and SAPs as if it were a router. These packets are only used by other switches and servers, not by the clients.

The switches will exchange IPX RIP packets to learn the IPX network groupings (i.e. the VLAN groupings). The RIP packets mean an EXTENSION of the same network NOT an ALTERNATE path (this is described in the previous IP section). The RIPs will only occur on switch to switch connections (also see the section on switch to router interfaces) and the switches can use this information to make those ports members of all VLANs. Also, as with IP, the switch to switch RIP will need to be modified so it will not confuse routers and or servers connected to the same ports as other level 3 switches. This allows the VSEs on the switches to determine the preferred client server combinations (i.e. associate clients with servers on the same Network/VLAN before using servers on other VLANs). This grouping is about the only use of the actual IPX network number in this situation because the unicast packets sent from the server to the client uses level 2 switching (the client has no concept of the actual IPX network number; only the servers, level 3 switches and routers would care about this value).

For devices such as print servers, the device acts as a client to the file server. It connects to the file server at boot up just as a client would. When a regular client wants to access the print server, it sends its request to the file server that it connected to. In some case the file server is also the print server.

The following should be noted:
1. Multiple encapsulation types exist on IPX networks (no more than one per IPX network number). In the router case, a client could be using 802.2 encapsulation and the server could be using SNAP encapsulation. The router would translate all unicast packets between the two systems and allow them to talk. In the switch case, this cannot be done because unicast packets are sent via level 2 switching. The best approach is to send a GSQ for each encapsulation type out all ports when the switch first comes up. The VSE would then cache the internal network number and MAC address and encapsulation types in the responses from each server, and respond to client NSQs and RIPs only with servers that have the same encapsulation type as the client. Most modern servers understand all the encapsulation types and this should not be much of a limitation. This will require the users to either configure all their clients/preferred server combinations with the same encapsulation or to allow all their servers to support all the needed encapsulation types. If all four encapsulations are supported on a given server then the port that server is on will need to be multi-netted with four IPX addresses. The periodic SAPs are also encapsulated, and a given SAP packet can only include SAPs with the same encapsulation that SAP used. For example, if server A had all four encapsulations and server B only responded to the GSQ with the 802.2 encapsulation, then all four encapsulations can be used for SAP packets including server A, but only SAP packets with 802.2 encapsulation can include server B.
2. Unlike a router, the switch cannot consolidate the SAP packets because it must be able to pass the individual server MAC addresses to other switches. This could increase the total number of SAP packets passed throughout the network. To help reduce this load there are several possible strategies.
    Clients do not need to see SAPs, therefore they should not be sent out ports where only clients exist. Send Saps out on ports with servers, level 3 switches and routers. To auto detect client only ports, watch for the lack of SAPs and/or RIPs. Some configuration overrides may also be necessary if static SAPs are configured on a connected router or level 3 switch. (switch to switch ports need to be detected, the GSQ sent out initially and a simple switch-to-switch protocol can be used for this purpose as mentioned in the broadcast isolation description).
    Allow the configuration of triggered SAPs and RIPs rather than sending them out ever 60 seconds.
    Use filtering to limit some servers/server types to specific portions of the network (this is also a security enhancement).
    Reduce the number of encapsulations in the network. A duplicate SAP would be sent out for each supported encapsulation.
3. The GSQ command requests a server (or router) to send information on all available servers. The client will then pick which one to use. The problem is that only one MAC address is sent for all the servers, the client could therefore send all unicast packets to the MAC address of the server who responded to the GSQ . The client expects the responder of the GSQ to route the packets to the correct server. The VSE can do one of several things at this point, it could send the GSQ response with its MAC address (like a router does) or it can send multiple responses as though they came directly from the individual servers. If it uses its MAC address then it will receive all the unicast traffic and it will need to do ROUTING. The best approach is for it to issue a sequence of SAPs as though they came from individual servers. The client-initiated GSQ is mainly a thing of the past because it generates a lot of traffic. In fact, new 95 clients do not support it. This problem is probably even less of a threat than it would first appear. In the GSQ case, the clients all seem to send out a subsequent RIP to find the best path to the server of their choice, they do not use the MAC address in the GSQ. As in the NSQ case, the switch can respond to the RIP with the MAC address of the server requested (in the GSQ we can only include servers that have the appropriate encapsulation type).

Figure 7:
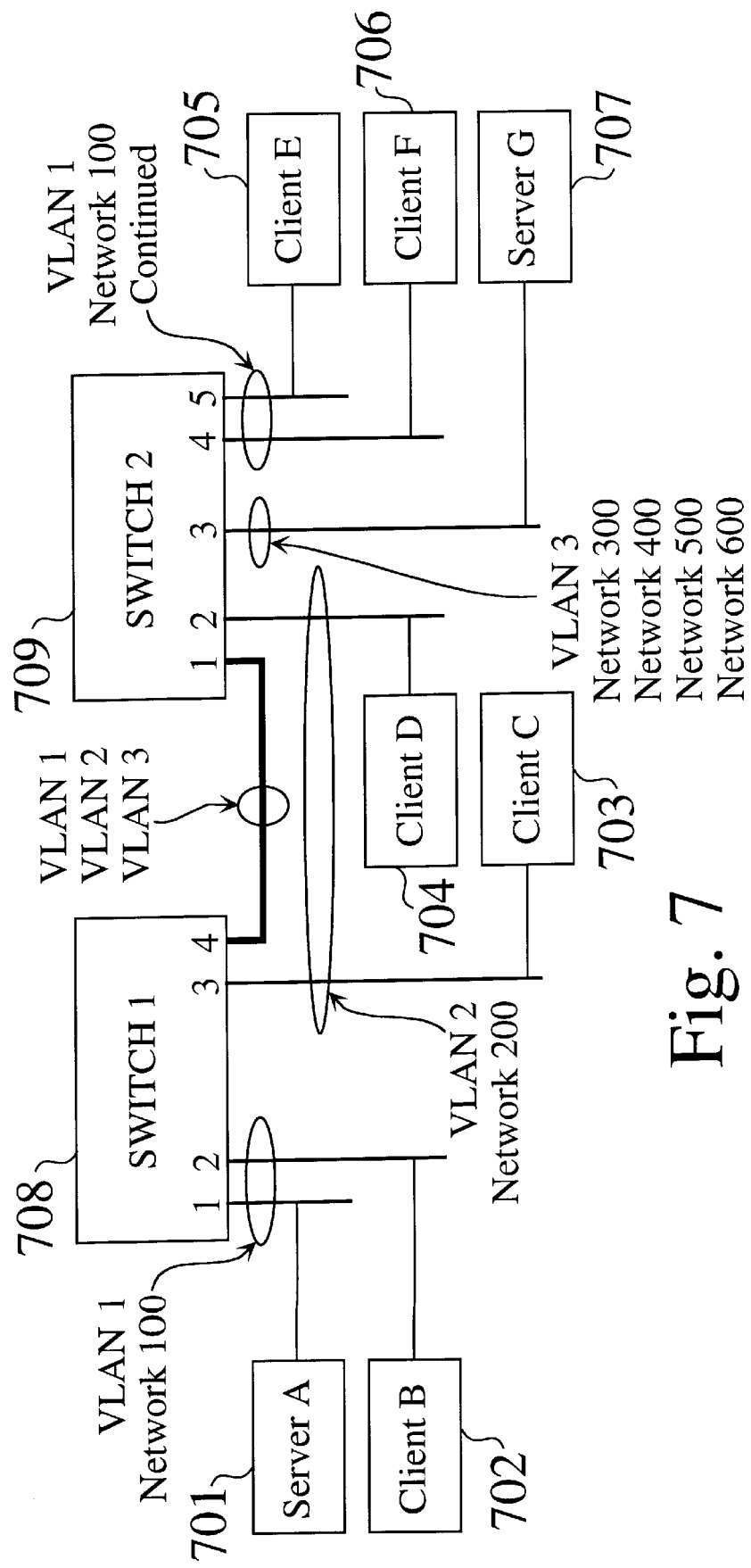
FIG. 7 illustrates a switch in an IPX network according to the invention.

Referring to FIG. 7, the following Scenarios will help to clarify how the switch will work with IPX. The following initialization is assumed for all the scenarios.

At boot up, both switches will send out four GSQ requests on all ports. One GSQ for each encapsulation type (802.2, Ethernet II, SNAP and Novell (802.3 Raw). Replies will come back on port 1 of switch #1 708 and port 3 of switch #2 709 because servers exist on these ports. The switch will cache up the MAC address and internal network number and supported encapsulation types for all the servers. We cannot expect that the GSQs sent between the switches to be answered with server addresses because both switches are assumed to boot at the same time (i.e neither switch will have learned about any servers at the time they received the GSQ request). To correct for this the switches should send an SAP immediately on reception of the response to the GSQ on all ports but the one that the GSQ was replied on. Once booted, the switches will then send out period SAPs triggered by the reception of SAPs from the servers (i.e. no separate SAP timer is needed in the switch). The periodic SAPs will not be consolidated as on a router. Assume that Server A 701 only knows 802.2 encapsulation. Server G 707 will respond with all four encapsulation types, therefore VLAN 3 has four IPX network numbers (300, 400, 500 and 600).

IPX Scenario 1 (Client server access on the same VLAN but a different switch).

In this scenario, Client E 705 on port 5 of switch #2 709 will access Server A 701 on port 1 of switch #1 708. Both Ports are in the same VLAN and hence have the same IPX network number (#100). As switch #1 708 passes the SAP from Server A 701 through on port 4 it only changes the HOP count (Intermediate Networks number) because port 4 contains VLAN 1. They must use the same encapsulation type because they are on the same network. Assume that 802.2 is the type of encapsulation used by client E 705 because we defined Server A 701 to only know 802.2 encapsulation.

Client E 705 will send out an NSQ. The NSQ is a broadcast packet and the switch will pass the packet up to the VSE for analysis. From the initialization sequence defined above, the VSE on switch #2 709 knows about Server A 701 and G 707. It also knows that Server A 701 is on the same VLAN and it sends the response to Client E 705 using Server A's 701 MAC address and internal network number. Server A 701 and Client E 705 must use the same encapsulation because they are on the same network number (in this case 802.2). If they were not, then VLAN 1 would have to be multi-netted and switch #2 709 would have to use Server G's 707 internal network number and MAC address in the response. In fact, the cost (hop count) to Server G 707 is less because it is directly connected to switch #2 709, but the VLAN/IPX network configuration requires that Server A 701 be chosen first because they have the same network number. In this switching infrastructure, this is about the only use of the IPX network number because unicast packets are not routed. The VSE in switch #2 709 knows the MAC address of Client E 705 and Server A 701. Client E 705 also knows the internal network number of Server A 701 and it will send out a RIP request to find the best route to the server. The VSE on switch #2 709 will respond to the RIP using the MAC address of Server A 701. The first unicast packet now goes through switch #2 709 via level 2 switching and out port 1. When the packet arrives at switch #1 708 it passes it to its VSE, which adds Client E 705 to the switch's MAC address table and forwards the packet to Server A 701. From this point on, all unicast traffic between Client E 705 and Server A 701 is transferred via level 2 switching.

IPX Scenario 2 (Client server access on a different VLAN but the same switch).

In this scenario, Client D 704 on port 2 of switch #2 709 will access Server G on port 3 of switch #2 709.

Client D 704 will send out an NSQ. The NSQ is a broadcast packet and the switch will pass the packet up to the VSE on switch #2 709 for analysis. From the initialization sequence defined above, the VSE on switch #2 709 knows about Server A 701 and G 707. It also knows that Server A 701 and G 707 are on different VLANs than Client D 704 (Different IPX networks). The VSE uses cost (hop count) to determine the best server to use (it would also have to make sure the encapsulation type was supported by the server). Server G 707 can use any of the four encapsulation types, each one assigned to a different network number. The VSE on switch #2 709 responds to Client D's 704 NSQ using Server G's MAC address, internal network number and the encapsulation type passed in the NSQ. The VSE in switch #2 knows the MAC address of Client D 704 and Server G 707. Client D 704 also knows the internal network number of Server G 707, so it will send out a RIP request to find the best path to Server G 707. The VSE on switch #2 709 responds to the RIP using the MAC address of Server G 707. From this point on, all unicast traffic between Client D 704 and Server G 707 is transferred via level 2 switching (the target IPX address that Server G 707 will see from the client will be network 200, a router would need this information to route packets back to the client).

IPX Scenario 3 (Client server access on a different VLAN and different switch).

In this scenario, Client C 703 on port 3 of Switch #1 708 will access Server G 707 on port 3 of switch #2 709.

Client C 703 will send out an NSQ (assume for this example the packet has SNAP encapsulation). The NSQ is a broadcast packet so the switch will pass the packet up to the VSE on switch #1 708 for analysis. From the initialization sequence defined above, the VSE on switch #1 708 knows about Server A 701 and G 707. It also knows that Server A 701 and G 707 are on different VLANs than client C 703 (different IPX networks). Although Server A 701 has a lower hop count, the VSE will use server G 707 because the encapsulation types must match. Server G 707 can use any of the four encapsulation types. The VSE on switch #1 708 responds to Client C's 703 NSQ using Server G's 707 MAC address, internal network number and SNAP encapsulation. The VSE in switch #1 708 knows the MAC address of Client C 703 and Server G 707. Client C also knows internal network number of Server G 707. Client C 703 sends out a RIP to find the best path to Server G 707. The VSE on switch #1 708 responds to the RIP using the MAC address of Server G 707. When the first unicast packet arrives from Client C 703 to switch #1 708 it passes it via level 2 switching out port 4. The packet now arrives at switch #2 709 which passes it to its VSE (first unicast packet). The VSE adds Client C 703 to the switch's MAC address table and forwards the packet to Server G 707. From this point on, all unicast traffic between Client C 703 and Server G 707 is transferred via level 2 switching.

Unsupported/un-routeable Protocols

Protocols that are not recognized by the VSE such as unknown broadcasts, unknown multicasts, unicast packets with unknown destination MAC addresses and/or whose source MAC address had not been seen before, will still be passed to the VSE. Because the VSE cannot process these packets, all it can do is put the source MAC address of these protocols on the user defined VLAN or drop them. It is possible that the VLAN they are put into can overlap or even be the same as any of the level 3 VLANs. However, they would all be on this one special VLAN. As long as hosts do not run multi-protocol stacks using the same MAC address, it is possible to tell the VSE to filter them. All packets from this host would always go through the VSE to be filtered because the VSE would not put the MAC address of this host system in the switch. This filtering will take some processing power, but because no packet analysis is being performed, it would be minimal. As with the routeable protocols, once the MAC addresses are learned (non-filtering case) they will proceed through the switching infrastructure at high speed and bypass the VSE.

Connecting to Routers

Many legacy networks already contain routers, therefore the level 3 switch must be able connect to these devices. There are two ways that this can be achieved. The first requires multi-netting of the router port connected to the switch and requires no additional switch software from what was discussed in Broadcast Isolation. However, the addition of a default route in the switch could limit initial broadcasts to be directed only to the router port when an unknown level 3 address was found. The second way to connect to routers will require the switch to act like a router at the port connected to the router.

Using an Internal Router

The VSE will talk to the router as a router. This allows the use of RIP (or any other routing protocol) and therefore simplifies the router configuration (no multi-netting). It also allows for more complete support of IPX. The problem with this solution is that the switch is actually a router on the port that connects to a router. This means all packets including unicast packets will go through the VSE when they come from the routed domain. The switch port connected to a router will either need to be configured to be a router by the user or will need to listen for routing packets and self configure for this functionality. Although this switch port will need to route, it can bypass the VSE for packets sent from the switching domain. To best explain how this would work refer to the following scenarios.

IP Switch to Router Connection

Figure 8:
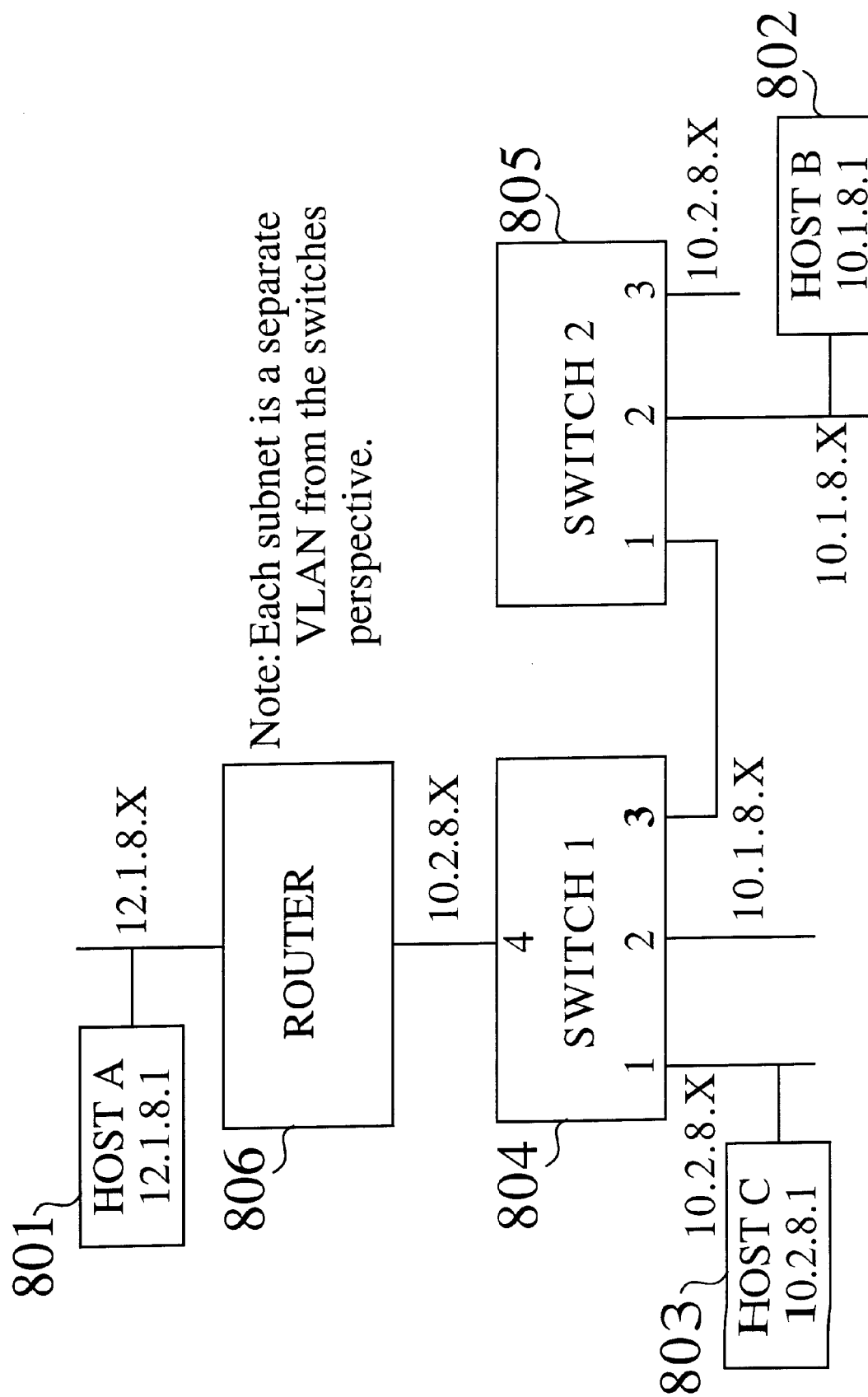
FIG. 8 illustrates an IP switch to router connection according to the invention.

Turning to FIG. 8, the first 3 scenarios will use IP. In these scenarios a router 806 separates the 12.1.8.X subnet from the 10.1.8.X and 10.2.8.X subnets which are in the switching domain. RIP packets are sent between the switches as in the switch only scenarios described previously. RIP packets are also sent between the router 806 and switch #1 804 over the 10.2.8.X subnet. Switch #1 804 has port 4 configured to do routing since it connects to the router. Each scenario will assume that the system has just booted and RIP packets have taught the switches and router about the reachable subnets (i.e. subnet locations are known, but host MAC addresses have not been learned.)

IP Scenario 1 (Packet transfer initiated from the router domain).

In this scenario, Host A 801 (12.1.8.1) initiates a conversation with Host B 802 (10.1.8.1). Host A 801 sends out an ARP request for Host B 802 (this may be addressed to the router if Host A 801 uses it as a gateway, otherwise the router 806 will proxy ARP). The router 806 will respond to the ARP. Host A 801 sends unicast packets to the router's 806 MAC address. The router 806 examines the packet and forwards it to switch #1's 804 MAC address, which it learned from RIP. All traffic from the router 806 will go to the VSE because switch #1 804 acts as a router on this port. The VSE at this point does not know about Host B 802 and it sends an ARP packet out ports 2 and 3 because they are on the 10.1.8.x network. This ARP contains the switch's MAC address as the source. When switch #2 805 gets the ARP packet it passes it to its VSE because the destination is not known. The VSE on switch #2 805 forwards the packet out port 2 and Host B will receive the packet. Once the ARP reply has reached switch #1 804, it will forward all future traffic to Host B using the router's 806 MAC address. Host B 802 can now send packets back to Host A 801. The unicast packets sent by Host B 802 will have a source MAC address of Host B 802, a destination MAC address of the router 806, a source IP address of Host B 802 (10.1.8.1) and a destination IP address of Host A 801 (12.1.8.1). When the first unicast from Host B 802 is sent (ARP reply), both switches send the packet to their VSEs for processing and Host B 802 will be put in their ARP cache (unlike a normal router, the packet initiated by Host B 802 and sent to the router 806 by switch #1 804 will contain a source MAC address of Host B 802, not the MAC address of the switch). After the first unicast packet, all further unicast packets sent by Host B 802 will bypass the switch VSEs and be sent via level 2 switching to the router 806.

IP Scenario 2 (Packet transfer initiated from the switching domain).

In this scenario, Host B 802 (10.1.8.1) initiates a conversation with Host A 801 (12.1.8.1). Host B 802 sends out an ARP request for Host A 801. The ARP is received by the VSE on switch #2 805 and forwarded out port 1 to switch #1 804. Switch #1 804 passes the ARP to its VSE. The VSE on switch #1 804 has learned that the 12.1.8.X subnet is reachable on port 4 (its routing port) and it can proxy ARP for the 12.1.8.1 Host using the router's 806 MAC address (it would also be possible for the VSE on switch #1 804 to pass the ARP packet unchanged to the router 806 if the router 806 has PROXY ARP turned on, however it would be more efficient and simpler for the user to have switch #1 804 respond. Another more complicated but also more complete method would be to have switch #1 804 send the ARP to the router 806 with the switch's MAC address and not proxy with the router's 806 MAC address until the ARP response comes back. This would allow switch #1 804 to receive ICMP host unreachable messages.). Host B 802 now receives the proxy response and sends unicast packets to Host A 801 with the router's 806 MAC address as the destination. The proxy response has taught the VSE on switch #2 805 about the router's 806 MAC address, and all unicast traffic from Host B 802 to Host A 801 bypasses the VSEs and goes directly to the router 806. The router 806 will now ARP for Host A's 801 MAC address. As soon as the router 806 receives a response, it forwards the unicast traffic. Host A 801 then sends unicast packets to Host B 802. The router 806 will forward them to the VSE on switch #1 804 which in turn will put Host B's 802 MAC address as the destination before forwarding the packet out on port 3. When switch #2 805 receives the packet it bypasses its VSE and sends the packet to Host B 802 via level 2 switching.

IP Scenario 3 (Transfer on a switch expanded router subnet).

In this scenario, Host A 801 (12.1.8.1) initiates a conversation with Host C 803 (10.2.8.1). This scenario is somewhat different than the others because the router 806 has a direct link to both subnets. Host A 801 sends out an ARP request for Host C 803 or for the router 806 if uses it as a default gateway. In either case, the router 806 will respond to Host A 801 which sends unicast packets to the router 806 destined for Host C 803. The router 806 will ARP for Host C 803 out its connection to the 10.2.8.X subnet. The VSE on switch #1 804 receives the request and forwards the ARP out ports 1 and 3. The VSE on switch #2 805 receives the packet and forwards it out port #3. Switch #2 805 will no longer be involved in this transfer because the response will only come out on port 1 of switch #1 804. The ARP response will be received by the VSE on switch #1 804 (first time source MAC address unicast). The VSE puts Host C 803 in its ARP cache and forwards the packet on to the router 806. The router 806 forwards all unicast traffic directly to Host C's 803 MAC address and the VSE on switch #1 804 will be bypassed. Unicast traffic from Host C 803 to Host A 801 will also bypass the VSE and go directly to the router 806 for forwarding. This example is much like the multi-netting case where the VSE is involved until the MAC address of the router 806 and the target host in the switching domain have been learned.

IPX switch to router connection

Figure 9:
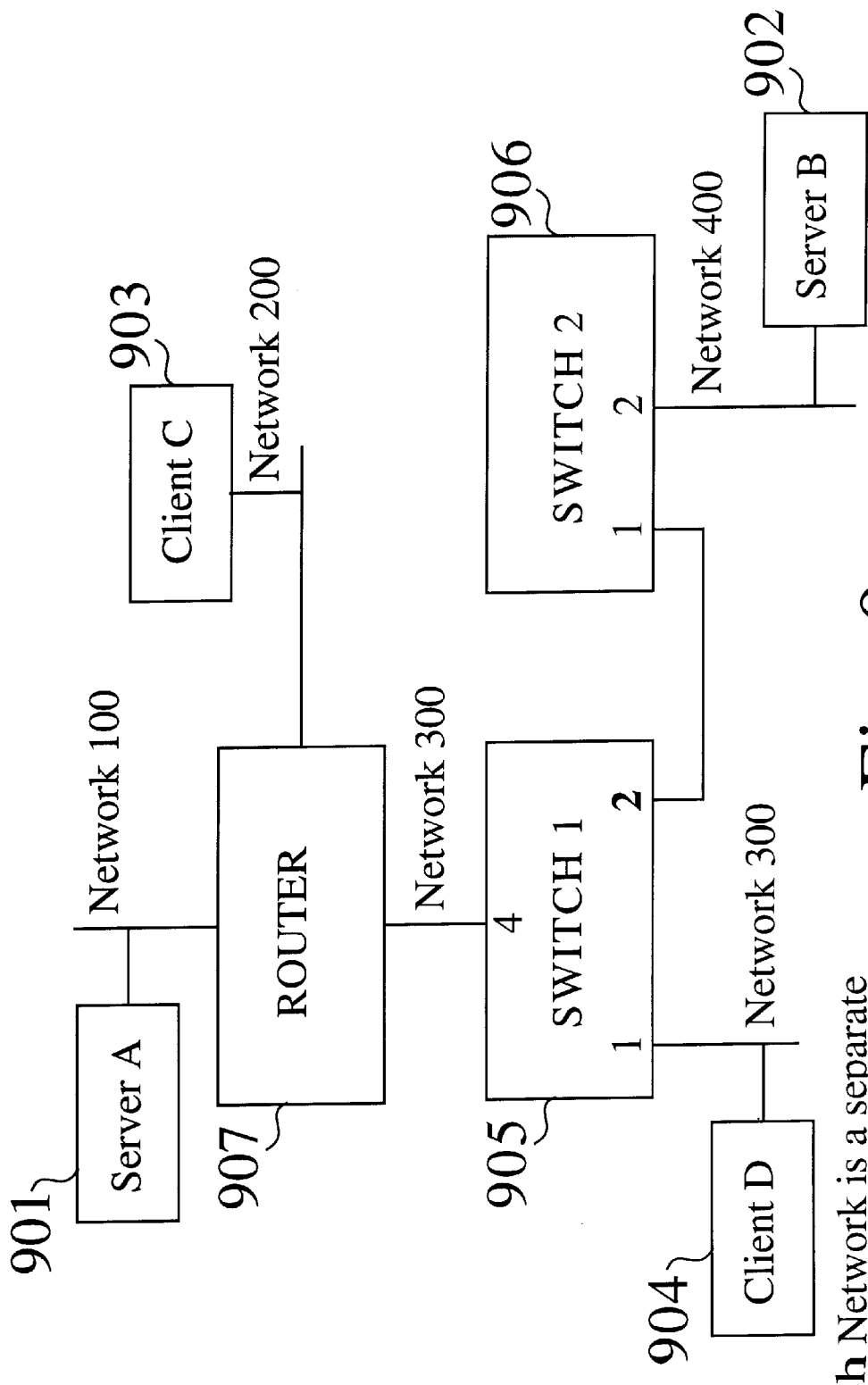
FIG. 9 illustrates an IPX switch to router connection according to the invention.

Turning to FIG. 9, the next scenarios will use IPX. In these scenarios a router 907 separates networks 100 and 200 from 300 and 400 which are in the switching domain. RIP packets are sent between the switches as in the switch only scenarios described previously. RIP packets are sent between the router 907 and switch #1 905 over the 300 IPX network. Switch #1 905 has port 4 configured to do routing because it connects to the router 907. Each scenario will assume that the system has just booted and RIP packets have taught the switches and router 907 about the reachable networks, and SAP packets have taught them about the servers. The router 907 will send out SAP packets using its MAC address as the source.

IPX Scenario 1 (Server on a router, client on a switch).

In this scenario, Client D 904 on port 1 of switch #1 905 will access Server A 901 on the router 907. No encapsulation problems should exist because the router can do encapsulation translation. For this example, assume that Server A 901 is preferable to server B 902 due to either cost or encapsulation values.

Client D 904 will send out an NSQ. The NSQ is a broadcast packet and the switch will pass the packet up to the VSE for analysis. From the initialization sequence defined above, the VSE on switch #1 905 knows about Server A 901 and B 902. The VSE on switch #1 905 responds to the NSQ with the router's 907 MAC address and Server A's 901 internal network number. The VSE in switch #1 905 knows the MAC address of Client D 904, and the router 907 which is the path to Server A 901. Client D 904 knows the internal network number of Server A 901 and it sends out a RIP request to find the best route to the server. The VSE on switch #1 905 responds to the RIP using the MAC address of the router 907. The first unicast packet now goes through switch #1 905 via level 2 switching and out port 4 directly to the router 907. The router 907 forwards the packet on to Server A 901. When Server A 901 responds to Client D 904, it sends the packets to the router 907. The router 907 knows to send the server responses to switch #1 905 because network number 300 was carried in the packets sent from Client D 904 (the router 907 learned about network 300 and next hop switch #1 905 from RIP packets sent from switch #1 905). The VSE on switch #1 905 analyzes the packet and sees that it is to be sent to Client D 904 and sends the packets out port 1. From this point on, all unicast traffic from Client D will go to the router 907 via level 2 switching and all return traffic will be routed at the router 907 and switch #1 905.

IPX Scenario 2 (Server on a switch, client on a router).

In this scenario, Client C 903 on the router 907 (network 200) will access Server B 902 on switch #2 906 port 2. As in scenario #1, no encapsulation problems should exist because the router 907 can do encapsulation translation. For this example, assume that Server B 902 is preferable to Server A due to cost (assume Server A 901 is on a low speed WAN).

Client C 903 will send out an NSQ. The router 907 will respond to the NSQ with its MAC address and Server B's 902 internal network number. Client C 903 sends out a RIP request to find the best route to the server. The router 907 will respond with its MAC address. Client C 903 sends unicast packets to the router 907 destined for Server B 902. The router 907 will look up the internal network number for Server B 902 that is contained in the destination packet sent by the client. Before forwarding the packet to switch #1 905, the router 907 modifies the source MAC address to be that of the router 907 and the destination MAC address to be that of switch #1 905 (the IPX network number is changed accordingly). The router 907 learned the MAC address of switch #1 905 from previous SAP packets (the VSE on switch #1 905 acts like a router on the router port). The VSE on switch #1 905 receives the packet, looks up the internal network number of Server B 902, modifies the destination MAC address to that of Server B 902 and the IPX address to be 400 and forwards the packet to port 2. When the packet arrives at switch #2 906 it goes directly to Server B 902 via level 2 switching. The VSE on switch #2 906 has already cached the MAC address of the router 907 and Server B 902 from previous SAPs. Server B 902 responds to Client C 903, by sending the packet directly to the router 907 via level 2 switching and bypassing the VSE in both switch #1 905 and #2 906. The router 907 routes the packet to Client C 903 on network 200. All unicast traffic from Server B 902 to Client C 903 will now proceed via level 2 switching to the router 907. All traffic from Client C 903 to Server B 902 will be routed at the router 907 and switch #1 905, but be sent via level 2 switching across switch #2 906.

Illegal Switch/Router configuration

Figure 10:
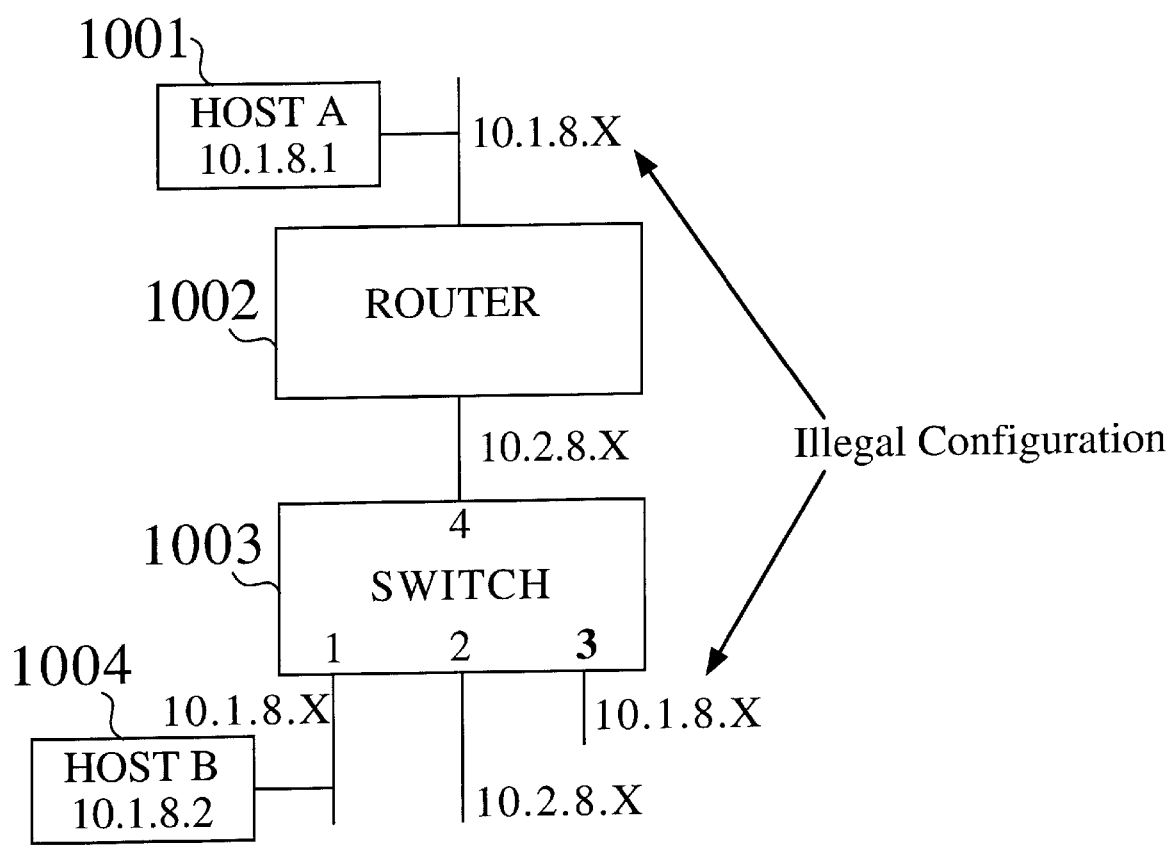
FIG. 10 illustrates an illegal switch/router configuration according to the invention.

In cases where a router is connected, the user cannot breakup a subnet across the router. Referring to FIG. 10, the router 1002 would treat each chunk of the subnet 10.1.8.x as an alternate route, not as a continuation of the same route as the switch 1003 would do. This configuration would never deliver some packets to the destination.

Security and Filters

This level 3 switching technique allows for easy filtering of broadcast packets because the VSE can do what ever is needed in software. A problem arises when unicast packets are considered. In that case, the routing engine has no control of the packets (except on initial transfer). The most the routing engine can do is stop certain broadcasts which would indirectly affect unicast packets. This method is fine to prevent accidental access but not good enough to protect against active attack. The term leaky VLAN is used to describe the transmission of unicast packets across a VLAN at level 2 with the broadcasts contained via level 3 packet examination. The following example will illustrate how broadcast protection works and its limits.

Figure 11:
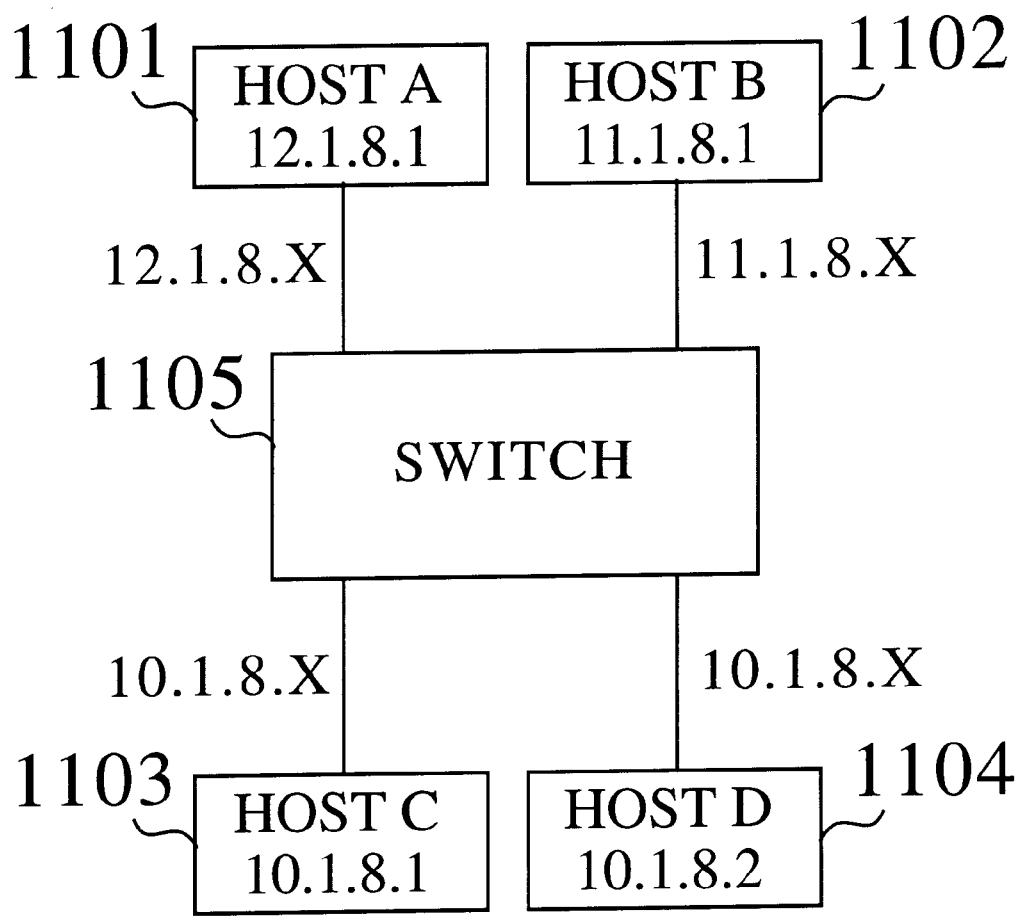
FIG. 11 illustrates broadcast protection across a VLAN according to the invention.

Example:

Turning to FIG. 11, assume that the user wants to allow subnets 12.1.8.X and 11.1.8.X to talk together, but keep all traffic to and from subnet 10.1.8.X confined to that subnet.

If Host B 1102 (11.1.8.1) tries to ARP for Host C 1103 (10.1.8.1) then the VSE can see the ARPs and block the traffic preventing the communication. Selectively filtering broadcasts can effectively prevent accidental access of areas that the network administrator wishes to protect because both IP and IPX protocols depend on broadcast information.

However, if a user has the ability to learn MAC addresses on restricted subnets (i.e. hook up a sniffer to a network that has restricted access, read ARP caches out of the switch, etc.). He could then artificially fill in his own host's ARP cache with the MAC address of the restricted host. The user would then only need to access a legitimate host to prime the switch 1105 with his own host's MAC and wait for the restricted host to do an access and its MAC address is in the switch 1105. With all the MAC addresses in place, the illegal access can take place with the switch 1105 being an unwitting participant. The traffic will flow between the hosts via level 2 switching.

One possible solution to this problem is to modify the ASIC so it passes another class of packets to the VSE for analysis. This class would be all unicast packets whose combination of source and destination MAC addresses have not been seen before. Using the example above, assume Host B 1102 has Host C's 1103 MAC address and both MAC addresses were already in the switch 1105. The first unicast packet sent by Host B 1 102 to Host C 1103 would be sent to the VSE because the combination of B 1102 and C 1103 had not previously been seen. If the access is allowed, then the VSE would send the packet through and enter this combination in the ASIC's table. If it is not allowed, then the packet would be dropped (optionally a log message and or a Simple Network Management Protocol (SNMP) trap could be sent). Level 2 switching occurs if the Host MAC address combination had been seen before. It does potentially require a much larger address table also because it would have Host A to Host B, Host A to Host C, Host A to Host D, Host B to Host A, Host B to Host C, etc. Not all N×N hosts talk together, typically one host is a server for many clients, and the clients rarely talk together (only MAC address combinations are saved when they try to talk together). It is also reasonable to say that A to B is the same as B to A to further reduce the table size requirements.

This technique flags any host to host communication and allows the switch VSE to perform base filtering on level 3 addresses in the packet. If multiple level 3 protocols are using a single MAC address on a host, then all of the level 3 protocols would need to be checked. If IP on Host A was allowed to talk to IP on host B, then IPX on those two hosts would also be allowed because the source destination combination would have been marked as OK during an IP transfer. Once allowed, the level 2 switching does no further checking. This limitation also means that an Application Level filter is not possible. If File Transfer Protocol (FTP) was allowed between Host A and Host B, then telnet would also be allowed. Application Level security is best left at the Application Level.

Spanning Tree and Redundant links

In some topologies the users would want alternate/redundant links to keep their network reliable. In a routing world the routing protocols tell the routers about alternate paths. The paradigm changes in a switch environment, a duplicate network (or subnet) coming in from a routing protocol would mean an extension of the same route, not an alternate route to the switch. One way to handle alternate roots in a switch environment is the same way for looping topologies. The standard protocol for this is spanning tree. The client/server nature of IPX has different implications for the way alternate routes can be handled with IPX versus IP. For non-supported level 3 protocols, treat them all as being on one VLAN and use a single instance of the standard spanning tree protocol.

IP with Spanning Tree

A separate instance of spanning per VLAN is NOT needed because the unicast traffic with level 3 switching is treated as a single VLAN, and all flooded traffic is controlled by the VSE. The following example will clarify the consequences of this statement.

Figure 12:
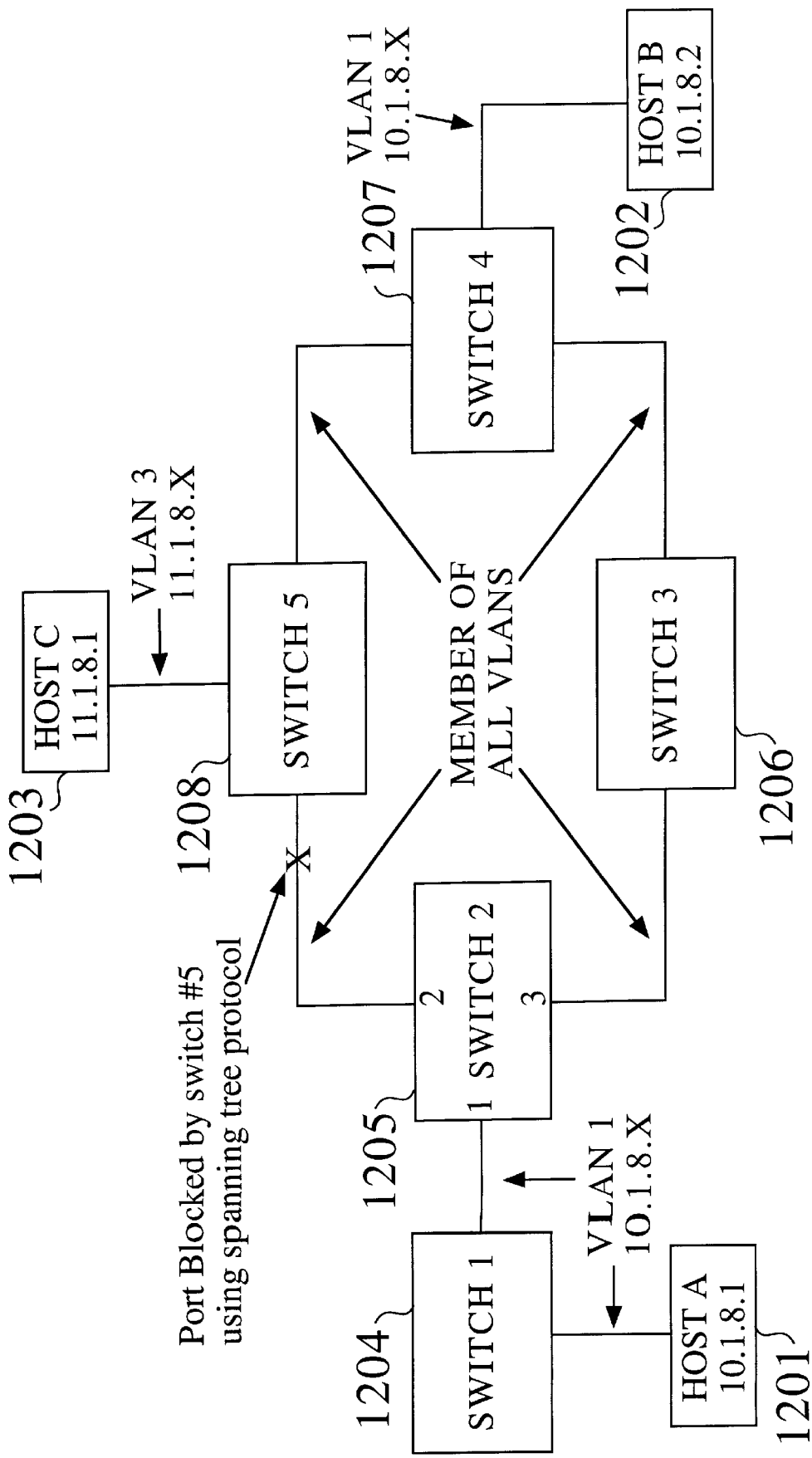
FIG. 12 illustrates a use of a spanning tree protocol in a loop according to the invention.

Example:

Turning to FIG. 12, switches #2 1205, #3 1206, #4 1207, and #5 1208 form a loop. Switch #1 1204 connects to switch #2 1205 and has all its ports in VLAN 1 (10.1.8.X subnet). Switch #2 1205 has one port in VLAN 1 and the rest of its ports (the ports forming part of the loop) in VLAN 2 (12.1.8.X subnet). Switch #3 1206 has all its ports in VLAN 2 and both its ports are in the loop. Switch #4 1207 has one port in VLAN 1, one port in VLAN 2 and one port in VLAN 3 (11.1.8.X subnet). The ports in VLAN 2 and VLAN 3 are its contribution to the loop. Switch #5 1208 has one port in VLAN 2 and two ports in VLAN 3, the loop is finished by one port in VLAN 3 and the port in VLAN 2. When the switches are first booted, spanning tree sends out its packets. Assume that switch #5 1208 is the one to block the loop. To find this loop a single instance of spanning tree is used, the VLAN boundaries are ignored. When spanning tree blocks this port, the level 3 switching will infer this to mean that the blocked port will not send out or receive any RIPs or other IP packets on the port. To see why RIP packets need to be blocked on the port, refer to the following scenario where they are not.

Scenario #1 (Level 3 packets are sent and received on a spanning tree blocked port).

Assume that switch #5 1208 sent RIP packets out to switch #2 1205. Switch #2 1205 will learn that it can access the 11.1.8.X subnet, the 10.1.8.X subnet and the 12.1.8.X subnet out port 2. It has learned from switch #3 1206 that it can get to these subnets via port 3. But switch #2 1205 does not treat these as alternate routes as a router would, it treats them as extensions of the same route. Assume that Host A 1201 sends out an ARP for Host B 1202. The ARP is forwarded by switch #1 1204 to switch #2 1205 which sends the ARP out both ports 2 and 3 to get to all the possible 10.1.8.X subnets extensions. The ARPs will be passed through to switch #4 1207 by both switch #5 1208 and #3 1206. Switch #4 1207 also knows that the 10.1.8.X subnet extends off of switch #3 1206 and switch #5 1208 and it passes it to the host and also forwards the ARPs on through. The ARPs are now going around in an infinite loop through the switching network.

Not always the Shortest Path:

From FIG. 12, it is apparent that breaking the loop with Spanning Tree will work. However, it will not always pass the packets via the shortest path. If we assume all the links have the same speed, packets passed from Host A 1201 to Host C 1203 would go through switch #1 1204, #2 1205, #3 1206, #4 1207, and #5 1208. To take the shortest path would only require going through switch #1 1204, #2 1205, and #5 1208. Although redundancy exists, the result is not necessarily the shortest path. This unfortunately has no solution with standard spanning tree. To correct this limitation would require a new protocol. Regular routing protocols will not work because they do not allow for the splitting of subnets which are allowed in a switch topology.

Each switch that is part of the loop would need to know which ports were associated with a loop.

There could be multiple loops that a given port is part of. The protocol will need to identify each loop individually.

The switch will need to figure out redundant network paths verses path extensions based on the loops found.

Routing information packets would need to pass the loop information along with the network number (perhaps with a Loop ID).

Once the redundant networks are known, the costs can be computed and the best route chosen.

In the switching network only the broadcasts/flooded packets are routed with the VSE. The unicast packet will merely be set up to follow the broadcasts as the MAC addresses are learned.

IPX and Spanning Tree

It may not be necessary to use spanning tree with IPX in a level 3 switching infrastructure. The following example examines what happens if there is a loop and a spanning tree is not used.

Figure 13:
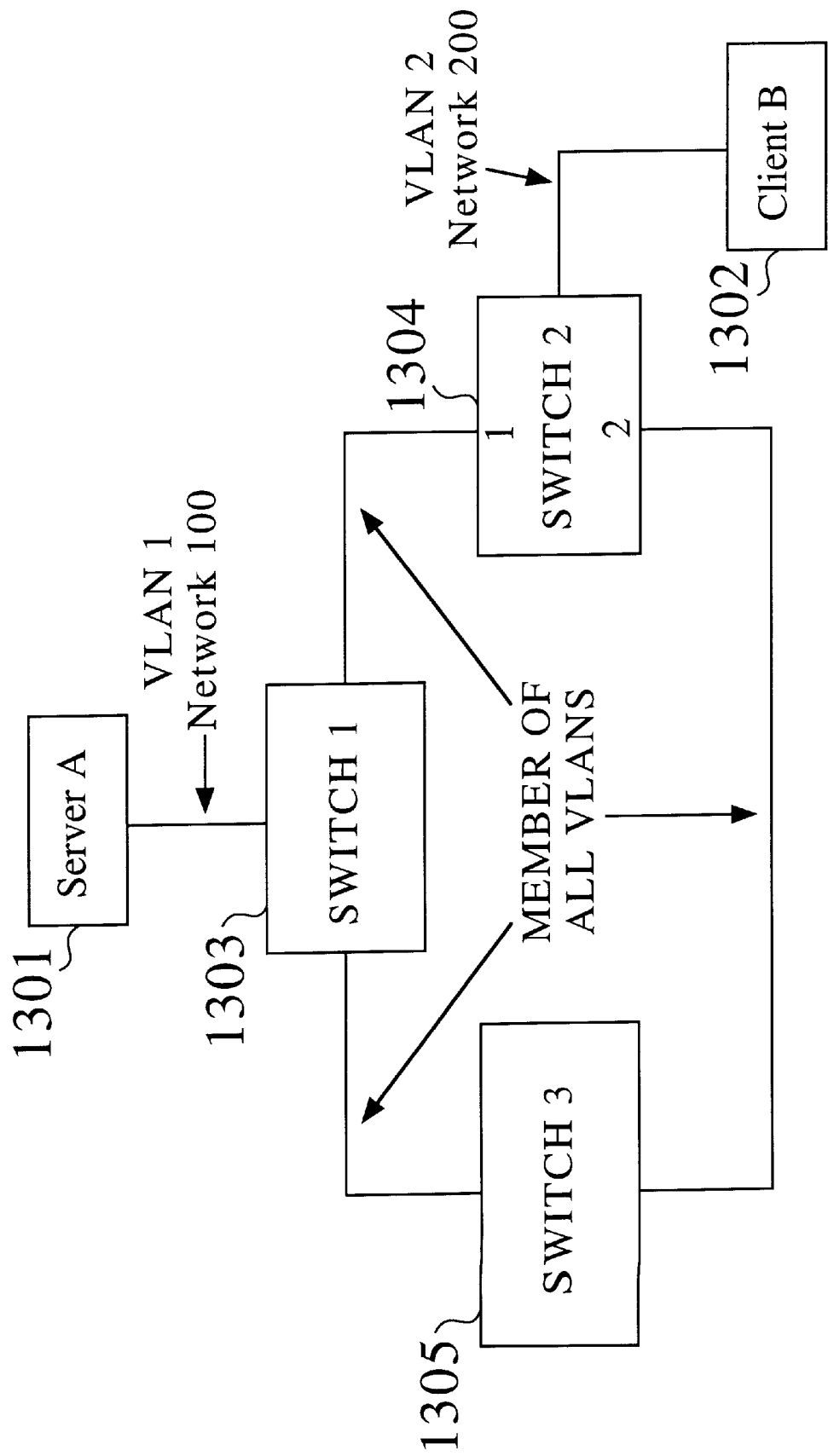
FIG. 13 illustrates a loop without a spanning tree protocol according to the invention.

Turning to FIG. 13, a loop is formed with switches #1 1303, #2 1304, and #3 1305. A Server A 1301 sits off of switch #1 1303 on VLAN 1 (Network 100). A Client B 1302 sits off of switch #2 1304 on VLAN 2 (Network 200). When the switches are first brought up, they send out their GSQ request and Server A 1301 responds. As the SAP from Server A 1301 gets to switch #1 1303 it floods it out to both switch #2 1304 and #3 1305. Switch #2 1304 and #3 1305 then forward the SAP to each other. The two switches throw away the SAP with the highest HOP count because the server MAC address is duplicated (SAPs contain a HOP count). If the HOP counts are the same, the switch can just pick one. In effect, the unique MAC address of the server with the periodic SAPs replaces the spanning tree protocol. Assume that Client B 1302 issues an NSQ, Switch #2 1304 will respond as it would in the non-loop case. The unicast traffic would then flow from switch #2 1302 to #1 1303. An exception to the above statement occurs with packet type 20 which are broadcast throughout the network, because these packets should not be duplicated, spanning tree would be needed. However, because the packets do go throughout the network, no shortest path needs to be found.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

I claim:

1. A process for reducing excessive packet traffic across a local area network segment, said process comprising the steps of:

receiving selected packets destined for the network segment;

checking the source address of said packets against a Media Access Control address table;

determining if said packets are broadcast packets;

determining if the destination address of said broadcast packets are known:

if said Level 3 addresses are known, then sending reply packet to source address: and if said addresses are unknown, then flooding all appropriate ports with said broadcast packets; and forwarding selected packets to a switch engine.

2. The process of claim 1, further comprising the steps of:

determining if said packets are unicast packets; and forwarding non-unicast packets to said switch engine.

3. The process of claim 2, further comprising the steps of:

determining if the source of said packets is said switch engine; and determining the destination ports for the packets received from said switch engine by using the Virtual Local Area Network mask in the packet header of said packets.

4. The process of claim 3, further comprising the step of:

determining if level 3 switching has been configured.

5. The process of claim 1, wherein said process is an application specific integrated circuit.

6. The process of claim 1, wherein said process is a software program.

7. The process of claim 1 further comprising the steps of:

recording packet source address and port number in said Media Access Control address table and Address Resolution Protocol cache;

determining if said packets are reply packets; and if said packets are reply packets, then forwarding said reply packets to destination address.

8. The process of claim 7, further comprising the step of:

if said packets are not reply packets, then recording destination address in said Address Resolution Protocol cache and sending said packets out all appropriate ports.

9. The process of claim 8, further comprising the step of:

filtering broadcast packets for specific subnets configured by the user.

10. The process of claim 8, further comprising the step of:

performing router functions.

11. An apparatus for reducing excessive packet traffic across a local area network segment, comprising:

a plurality of network ports for sending and receiving packets;

a switching module for high-speed packet switching; and a switch engine comprising:

a mechanism for receiving selected packets, determining if said packets are broadcast packets, sending reply packet to the source address for known destination addresses, and flooding all appropriate ports with said broadcast packets for unknown destination addresses;

wherein said switching module compares the source address of said received packets against a Media Access Control address table and forwards selected packets to said switch engine.

12. The apparatus of claim 11, wherein said switching module further comprising:

forwarding non-unicast packets to said switch engine.

13. The apparatus of claim 12, wherein said switching module further comprising:

sending the packets received from said switch engine to the destination ports using the Virtual Local Area Network mask in the packet headers of said packets.

14. The apparatus of claim 13, wherein said switching module further comprising:

determining if level 3 switching has been configured.

15. The apparatus of claim 11, wherein said switching module further comprises an application specific integrated circuit.

16. The apparatus of claim 11, wherein said switching module further comprises a software program.

17. The apparatus of claim 14, wherein said switch engine further comprising:

recording packet source address and port number in said Media Access Control address table and Address Resolution Protocol cache and forwarding reply packets to their destination address.

18. The apparatus of claim 17, wherein said switch engine further comprising:

recording packet destination address in said Address Resolution Protocol cache and sending non-reply packets out all appropriate ports.

19. The apparatus of claim 18, wherein said switch engine further comprising:

user configurable filter for broadcast packets.

20. The apparatus of claim 18, wherein said switch engine further comprising:

performing router functions.

* * * * *